(12) United States Patent
Kole, Jr.

(10) Patent No.: US 6,779,617 B1
(45) Date of Patent: Aug. 24, 2004

(54) MULTIWHEELED MODULAR RIGID FRAME VEHICLE

(76) Inventor: James S. Kole, Jr., 2901 Elmside, No. 105, Houston, TX (US) 77042

( * ) Notice: Subject to any disclaimer, the term of this patent is extended or adjusted under 35 U.S.C. 154(b) by 0 days.

(21) Appl. No.: 10/145,770

(22) Filed: May 15, 2002

(51) Int. Cl.[7] ............................................. B62D 61/12
(52) U.S. Cl. .................................................. 180/24.08
(58) Field of Search ............................. 180/24.08, 65.2

(56) References Cited

U.S. PATENT DOCUMENTS

| | | |
|---|---|---|
| 3,052,311 A | 9/1962 | Leedom |
| 3,101,150 A | 8/1963 | Janson et al. |
| 3,168,927 A | 2/1965 | Garner |
| 3,198,551 A | 8/1965 | Garner |
| 3,504,753 A * | 4/1970 | Rutley ........................ 180/14.7 |
| 4,210,218 A | 7/1980 | Oswald et al. |
| 4,266,625 A | 5/1981 | Garner et al. |
| 4,299,530 A * | 11/1981 | Schaeff ........................ 414/719 |
| 4,469,369 A | 9/1984 | Belik et al. |
| 4,782,906 A | 11/1988 | Kole |
| 5,685,563 A | 11/1997 | Ottestad |
| 5,823,569 A | 10/1998 | Scott |
| 6,003,935 A * | 12/1999 | Kalazny ....................... 296/204 |
| 6,138,783 A | 10/2000 | Chene et al. |

FOREIGN PATENT DOCUMENTS

| | | |
|---|---|---|
| FR | 796829 | 1/1956 |
| FR | 2 593 767 | 8/1987 |
| WO | WO 94/14628 | 7/1994 |

OTHER PUBLICATIONS

John Deere Model No. TC44H TC54H TC62H Quickl–Coupler, John Deere Construction Equipment Division, cover page, p. 4–5.

New Holland LB115 4–Wheel Steer Loader Backhoe, 1 page.
John Deere Crawler Dozer Model 650H, 1 page.
John Deere 495D Excavator Specification Sheet, C–9–88, 1 page.
Kobelco Bladerunner ED 180, 1 page.
John Deere Model 8000T Series Tractors Specification Sheet, printed in USA (96–07), 1 page.
Model 570B Specification Sheet, 1 page.
Melroe M–880 Power Module Specification Sheet, 2 pages.
New Holladn TV140 Bidirectional Tractor brochure, 5 pages.
Clark–Hurth 12S Series and Model 279 Planetary Steer Axle information sheet, 1 page.

* cited by examiner

Primary Examiner—Charles T. Jordan
Assistant Examiner—Bret Hayes
(74) Attorney, Agent, or Firm—Geoffrey A. Mantooth

(57) ABSTRACT

A vehicle can be designed using modular frame components. There is provided a chain tank module having one or more chain tanks and an adapter module which provides spacing between individual chain tank modules. Wheels are mounted to the chain tank modules. The chain tank modules have wheel cogs to receive drive chains and also receptacles for receiving axles for the wheel hubs. The frame allows the use of steerable or nonsteerable axle assemblies to accommodate a wide variety of steering mechanisms for vehicles. By utilizing the chain tank and adapter modules, frames of different lengths, widths and wheel configurations can be designed and constructed using a small number of standard interchangeable parts. The cab and engine components are mounted onto a skid which in turn is mounted onto the frame. Drive chains are utilized to rotate the wheels. The drive chains extend through the chain tanks which contain a lubricant therein.

19 Claims, 24 Drawing Sheets

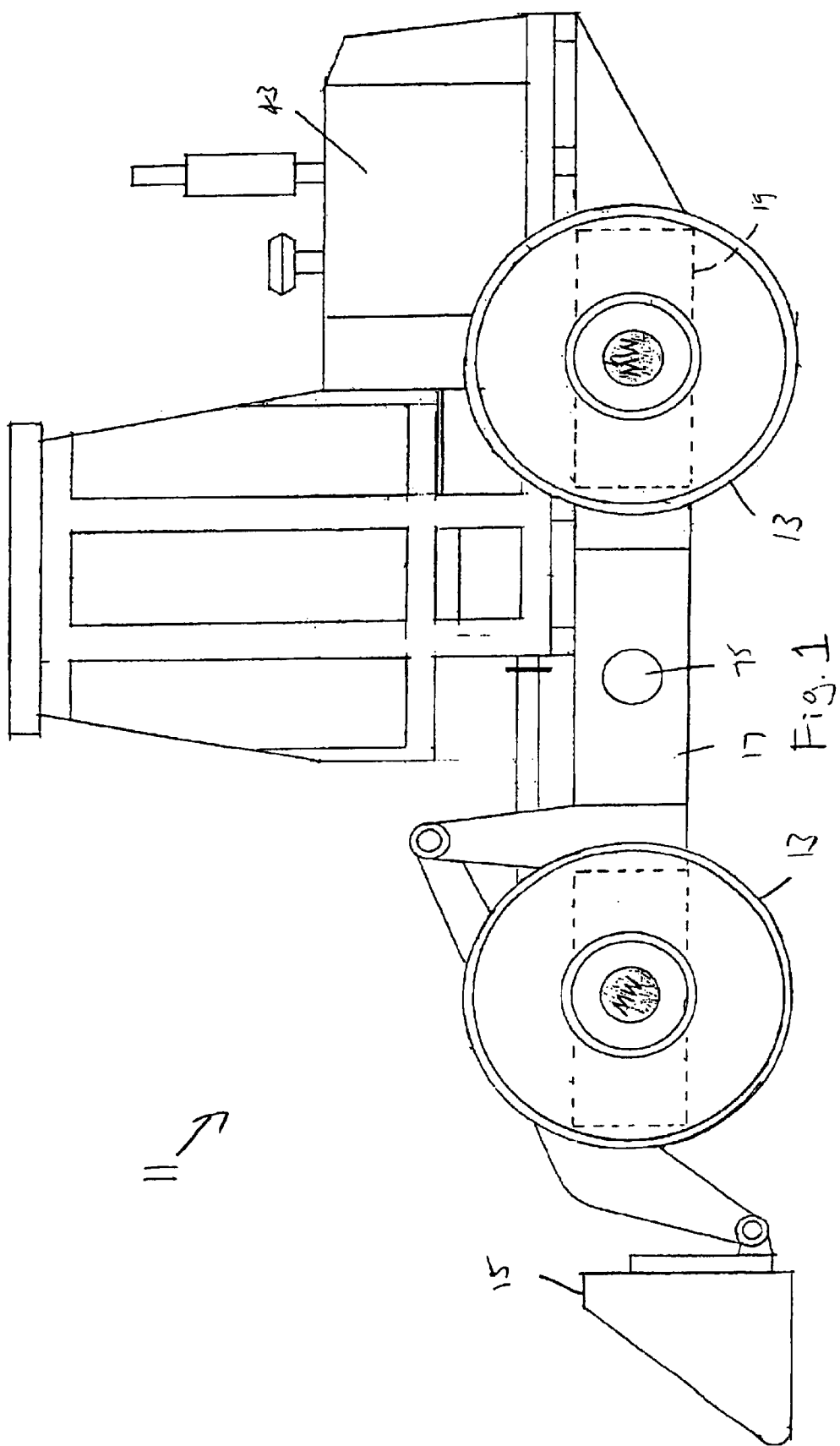

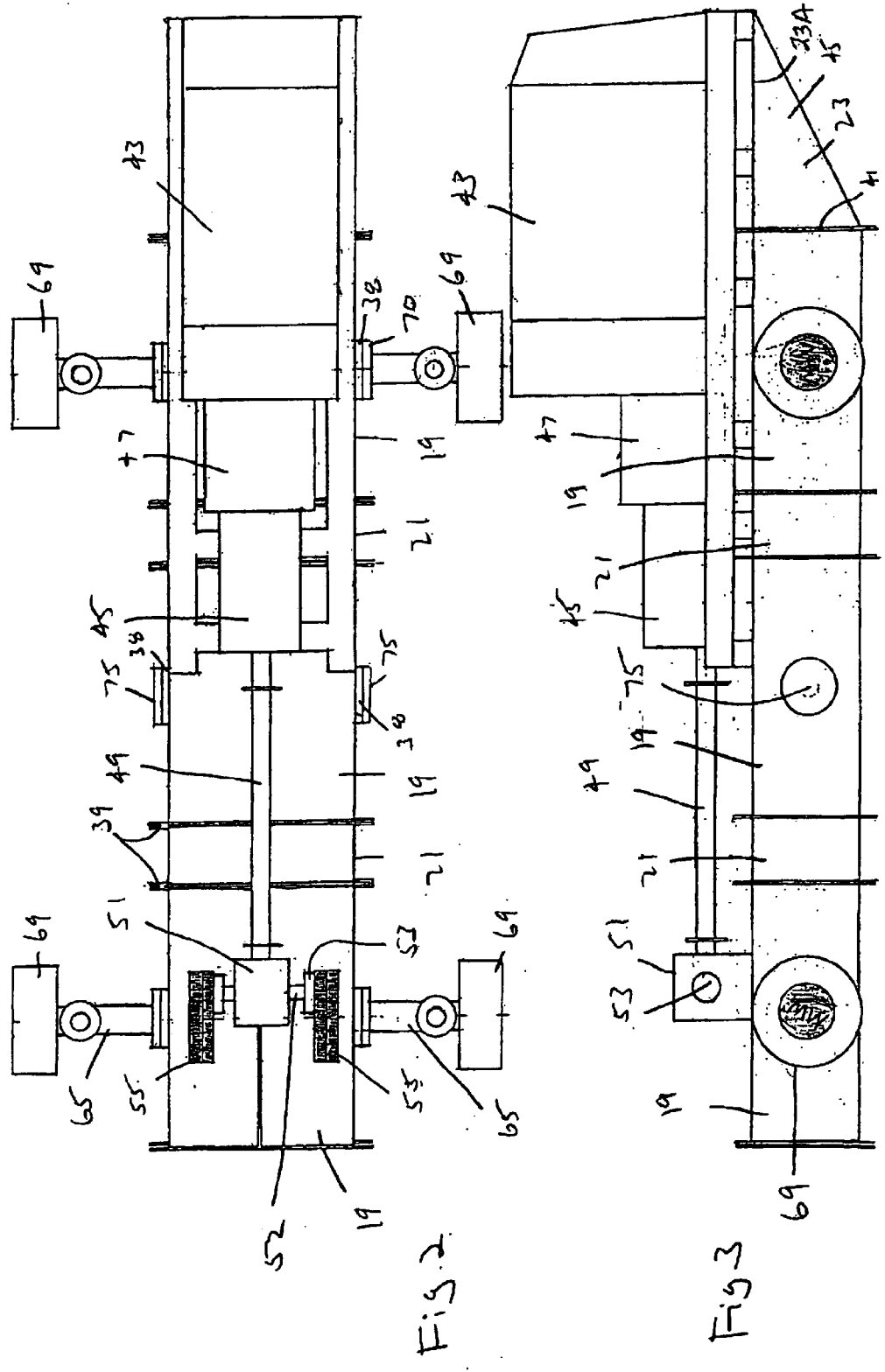

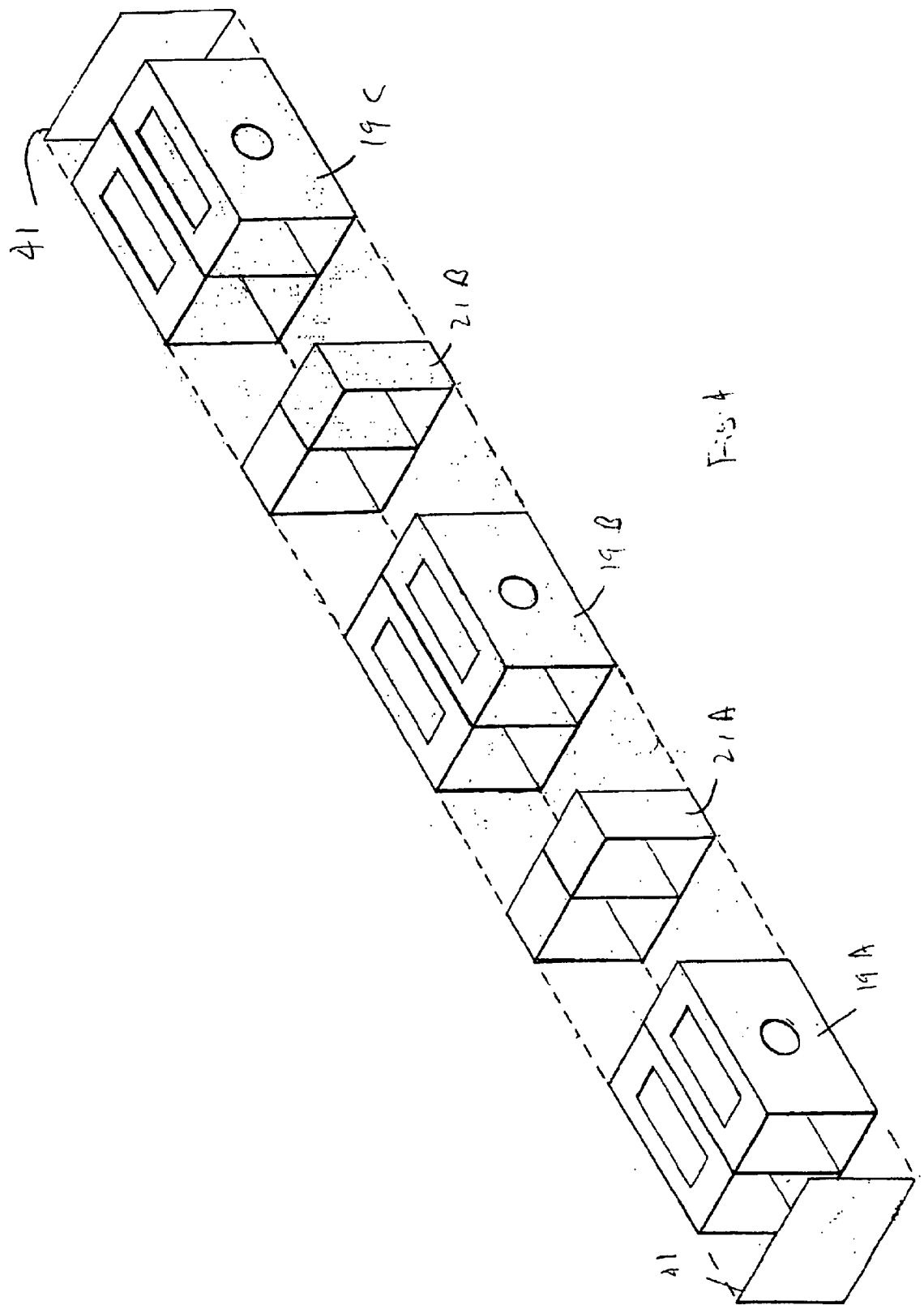

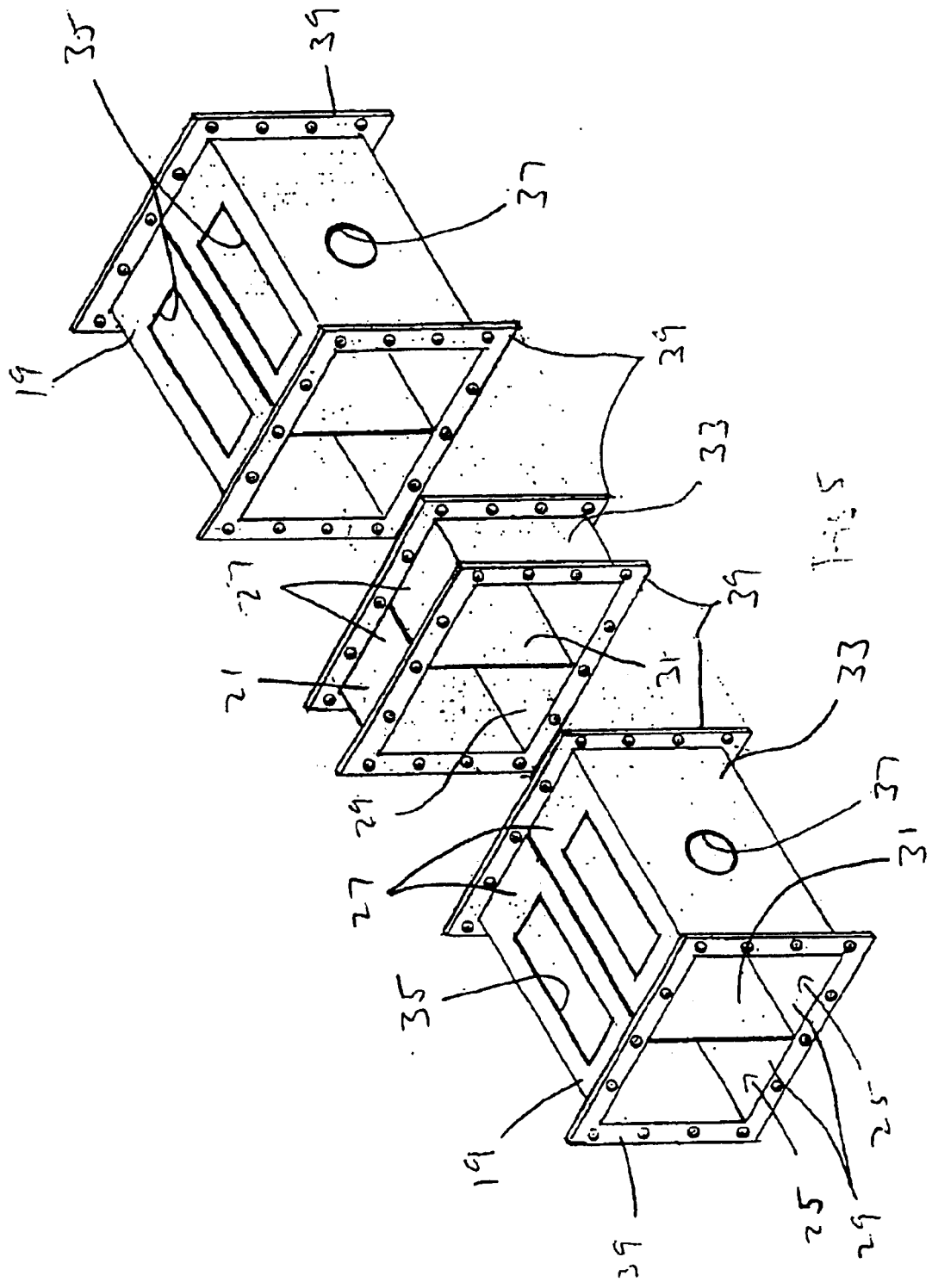

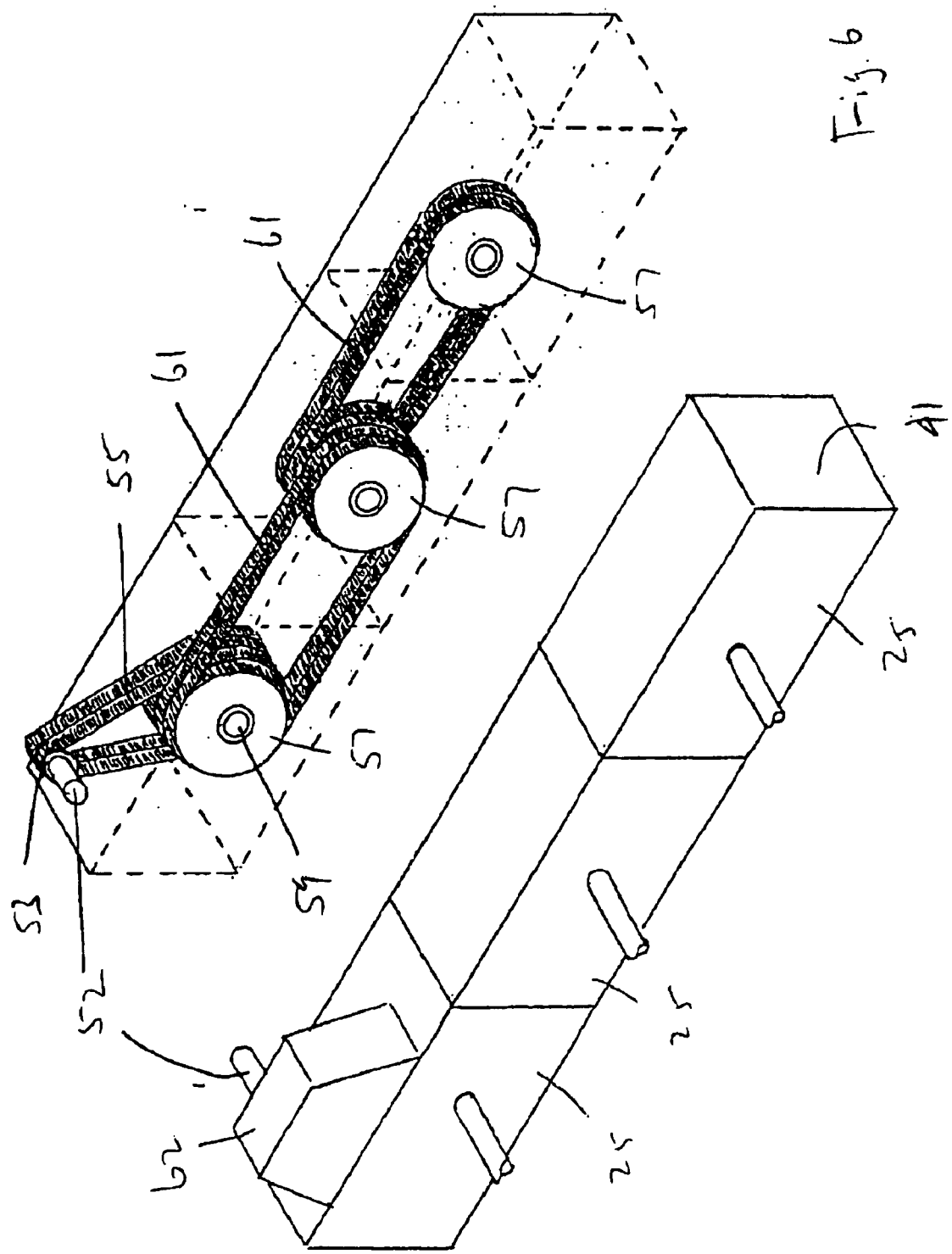

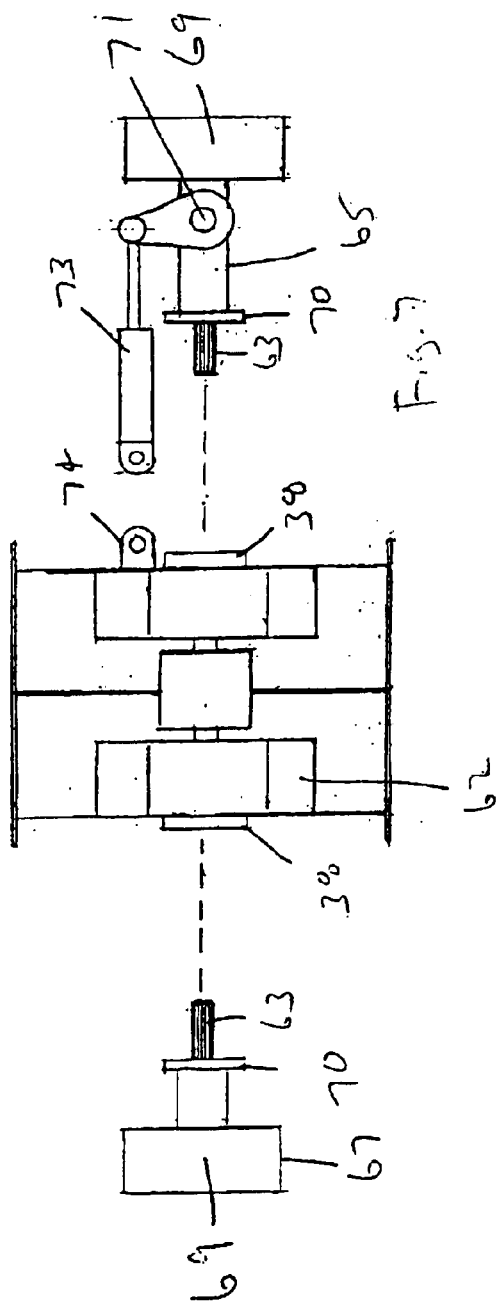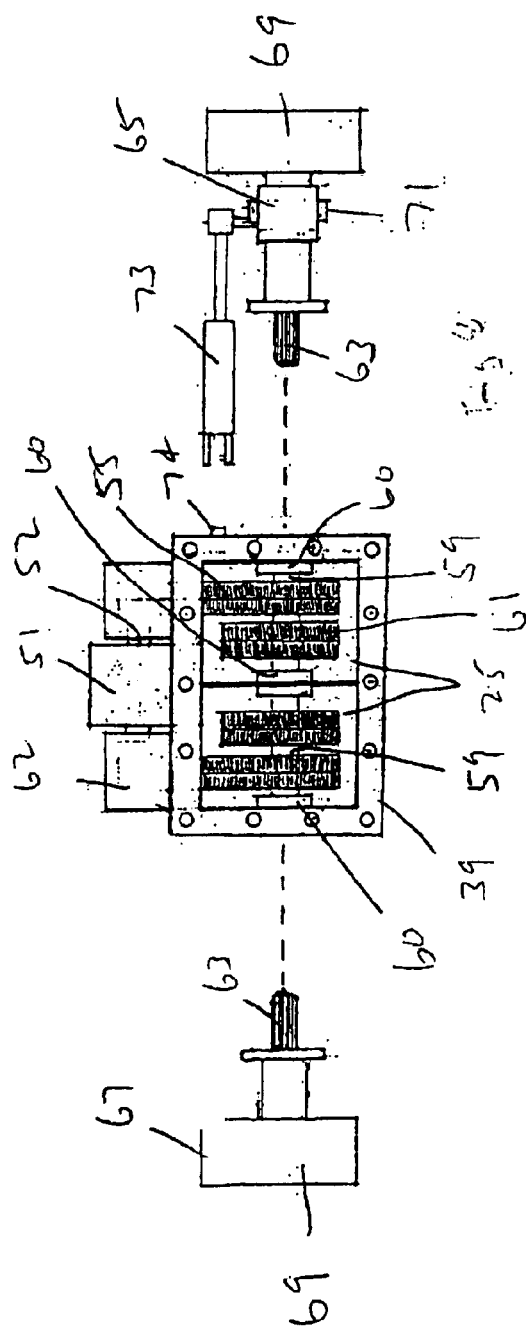

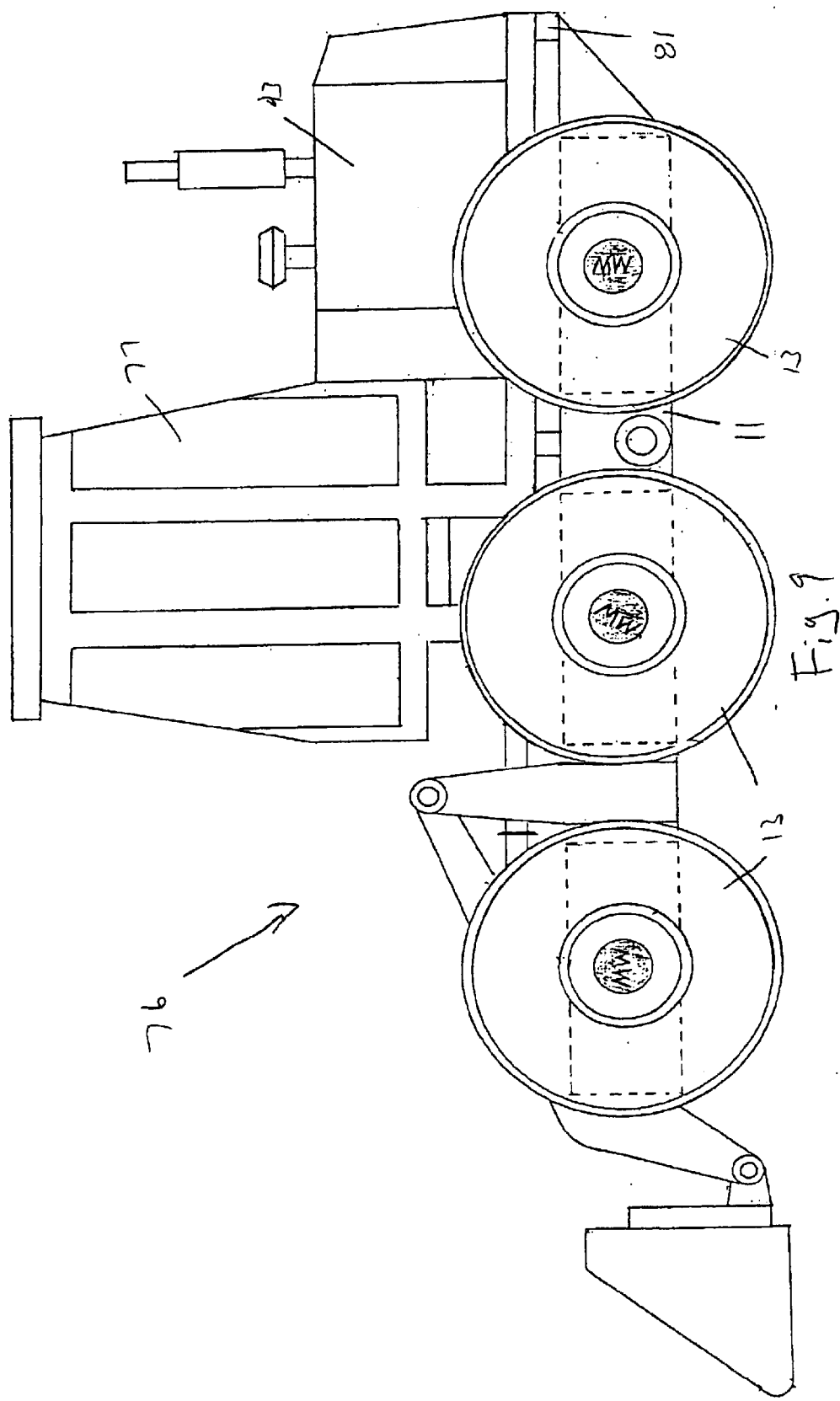

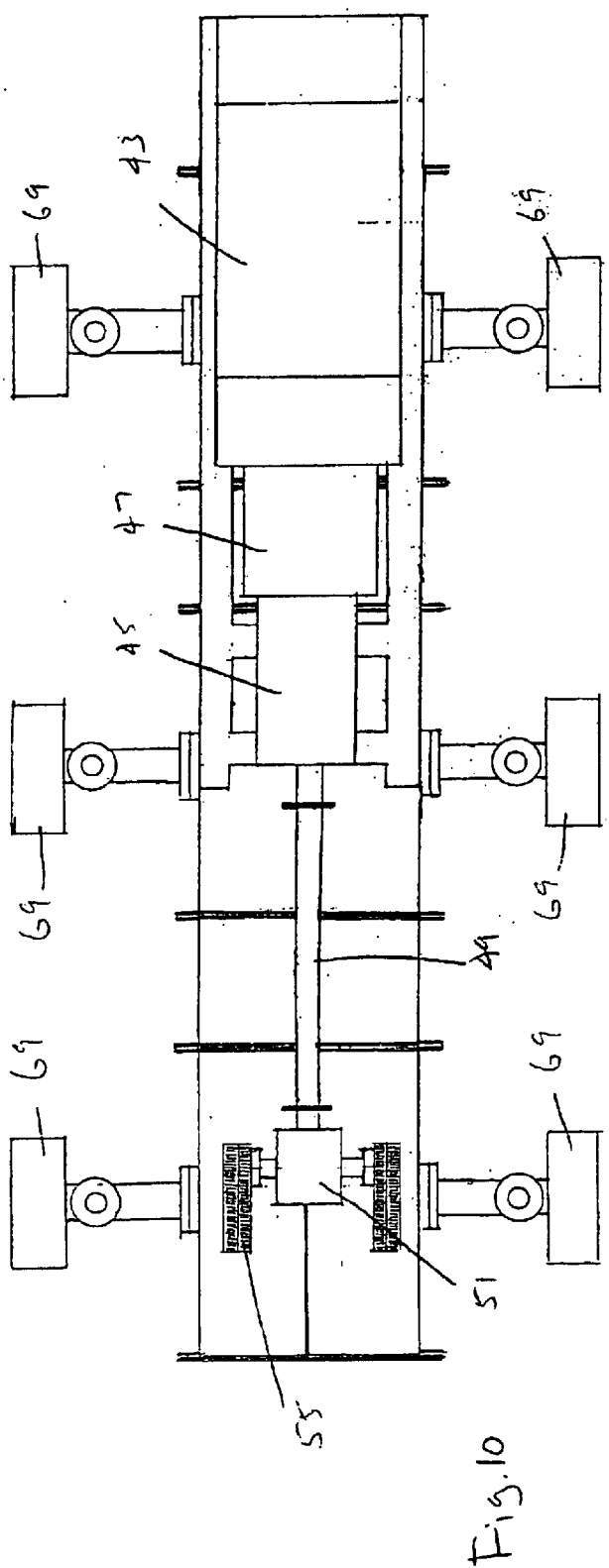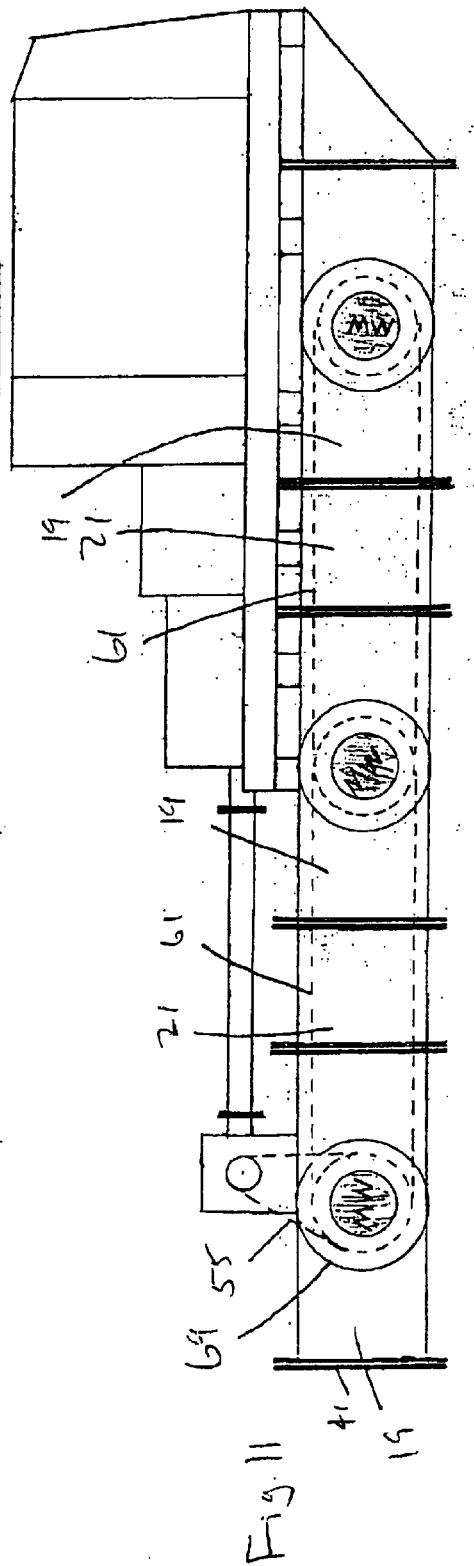
Fig. 10
Fig. 11

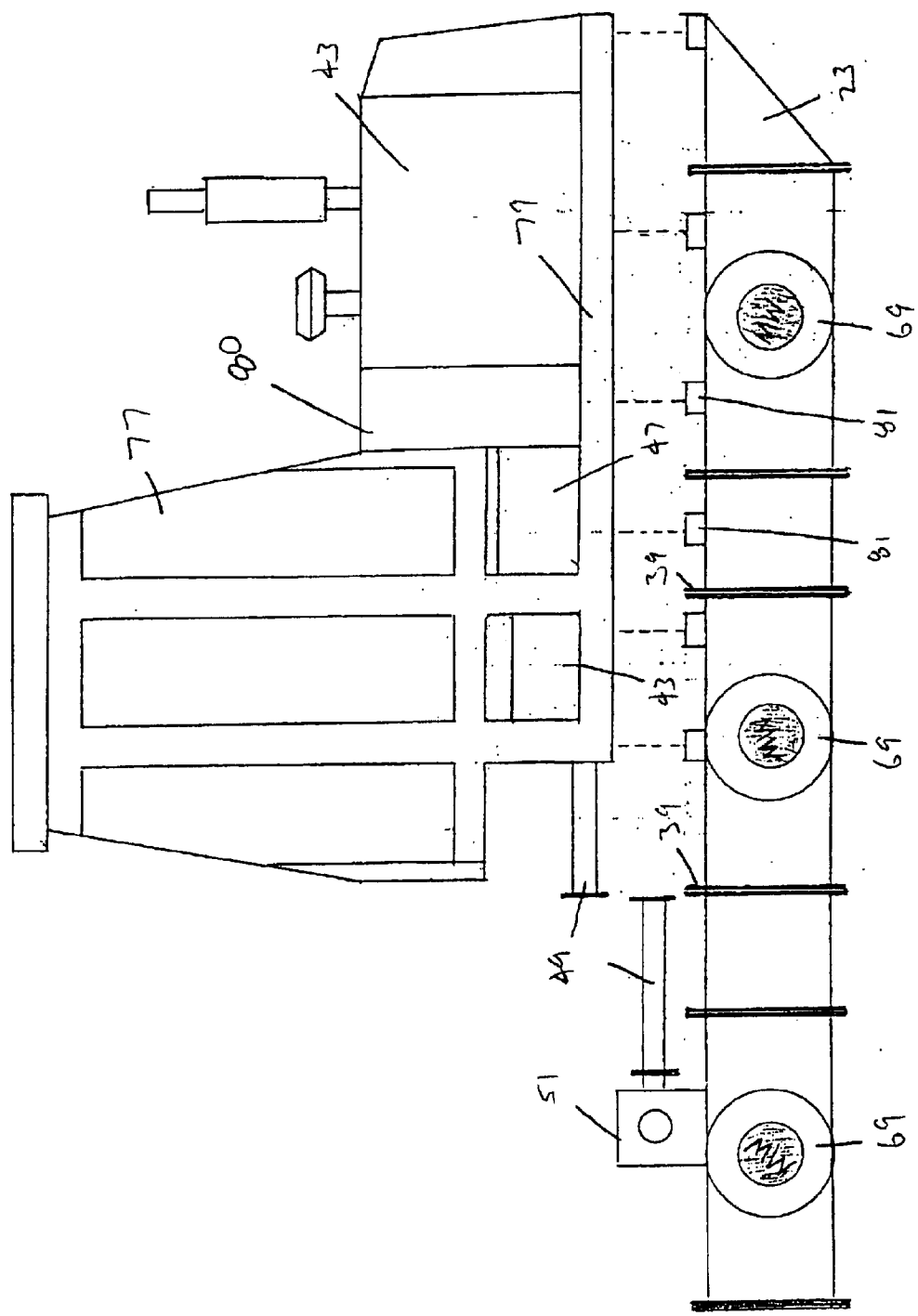

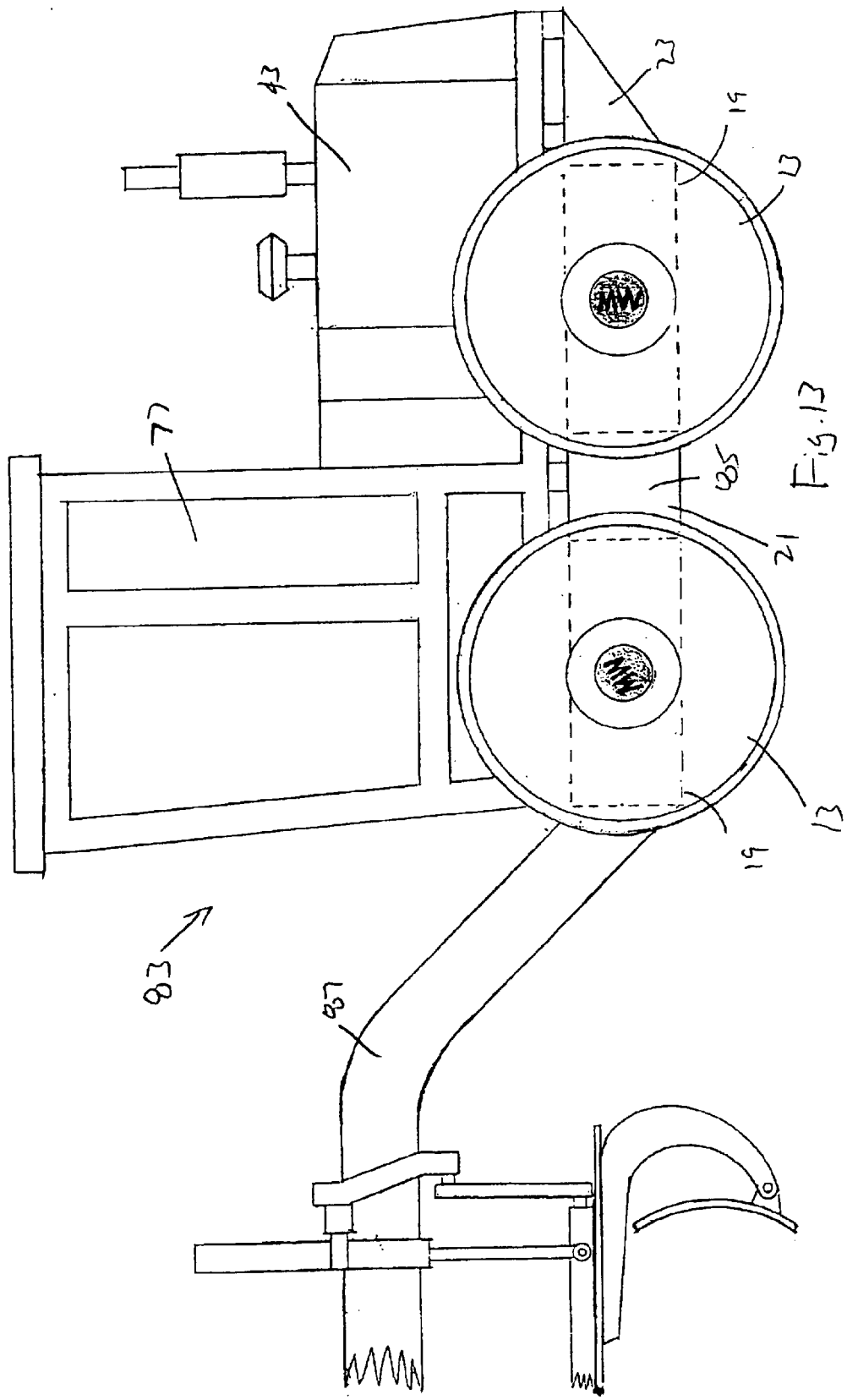

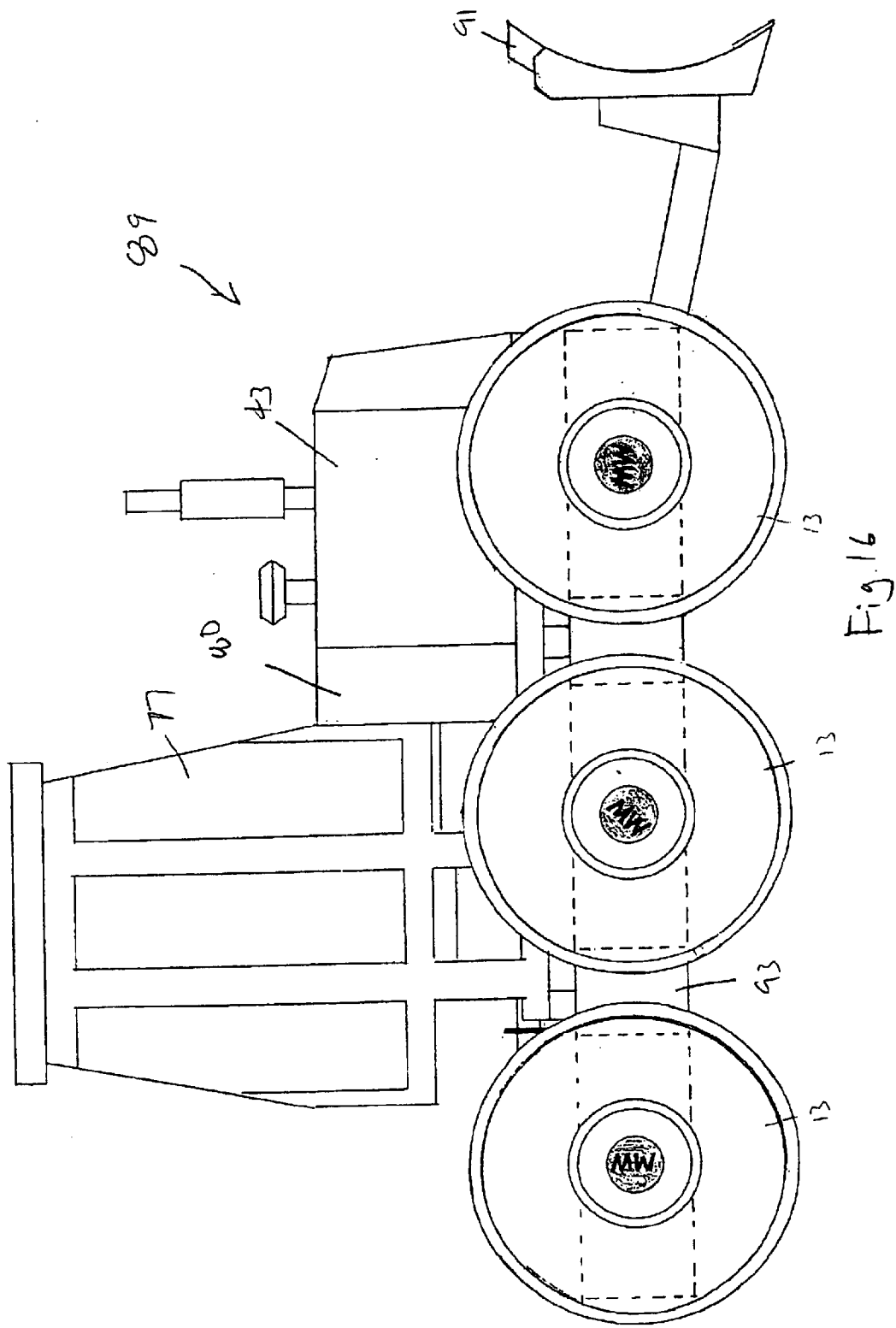

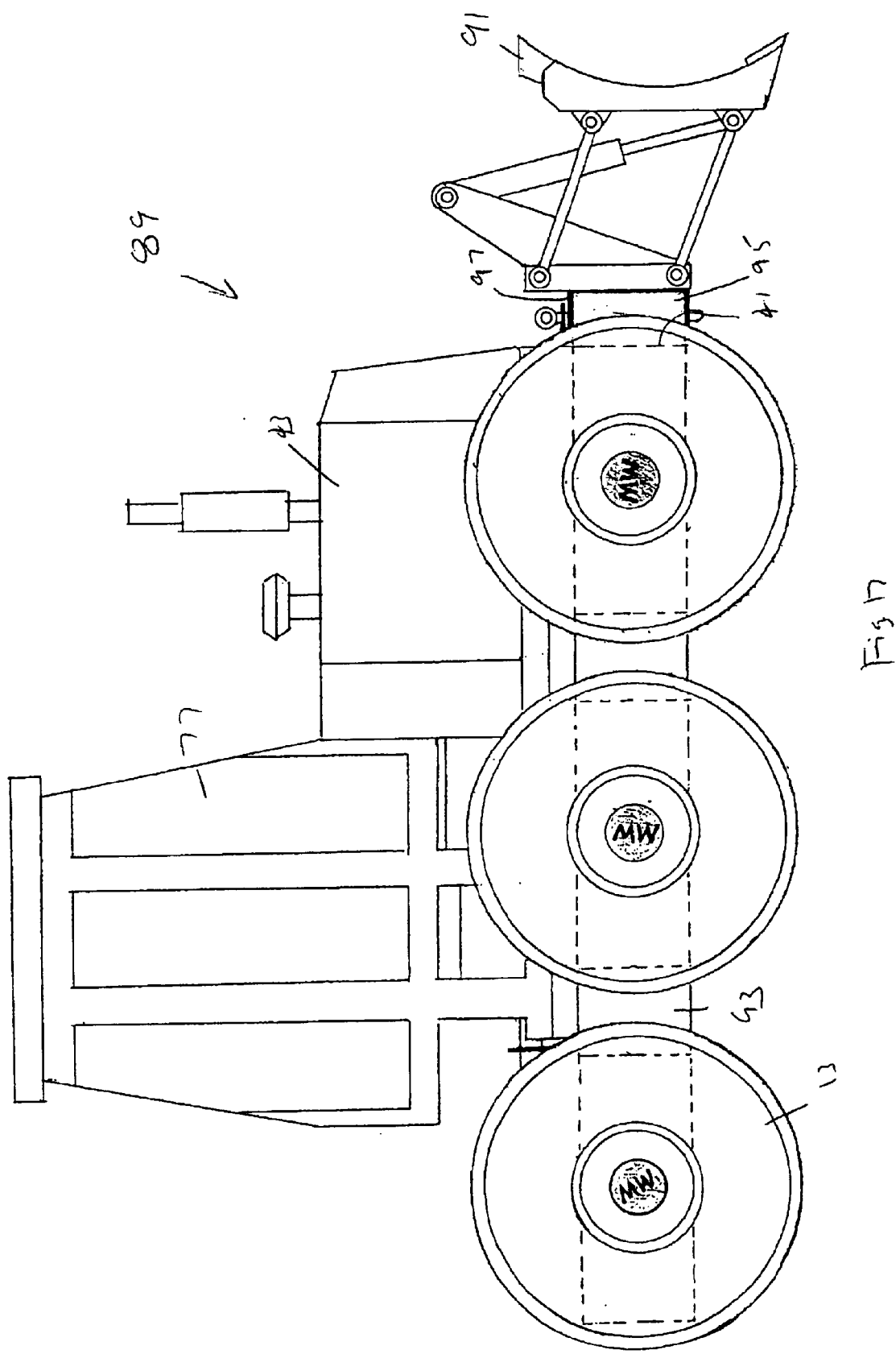

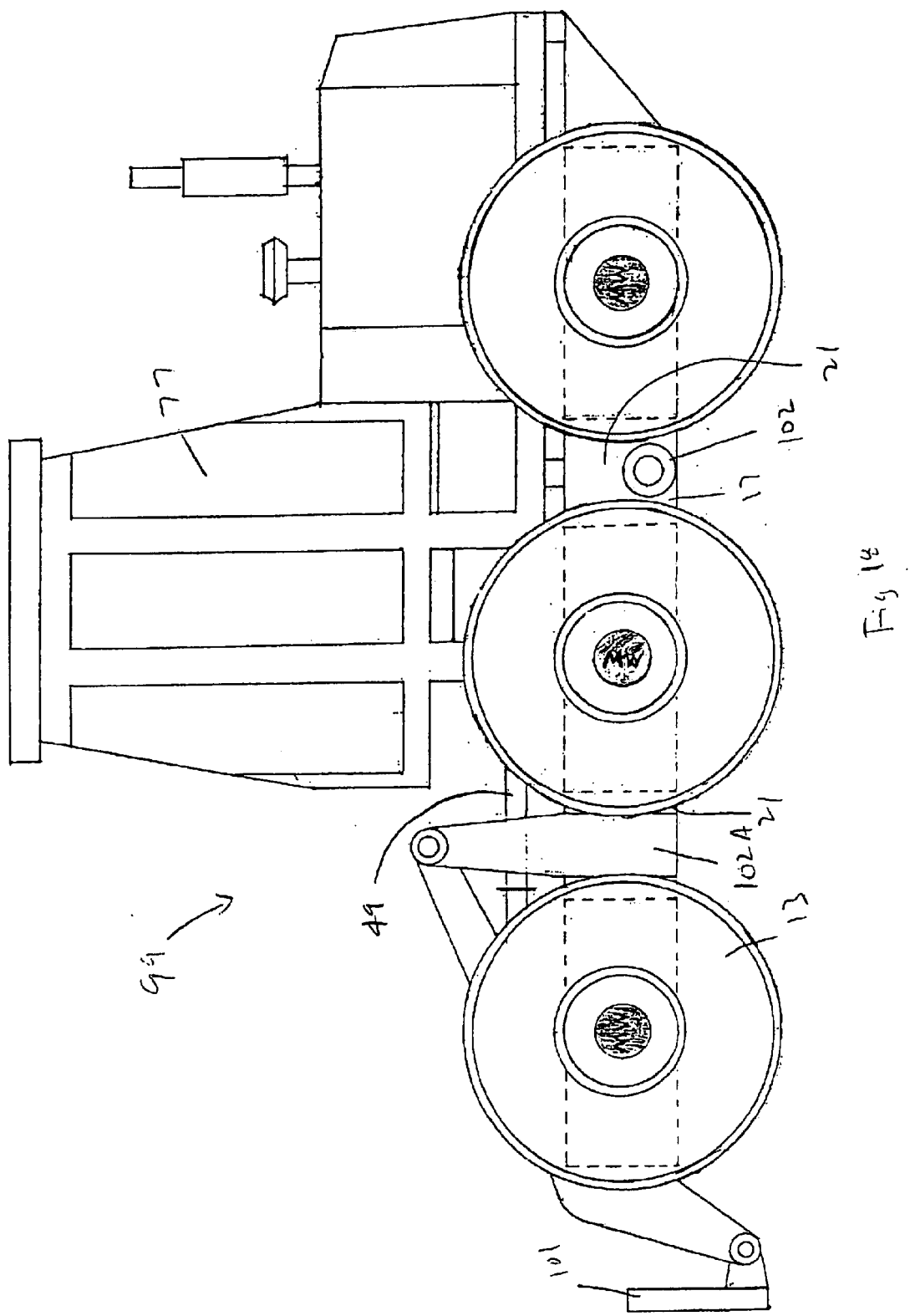

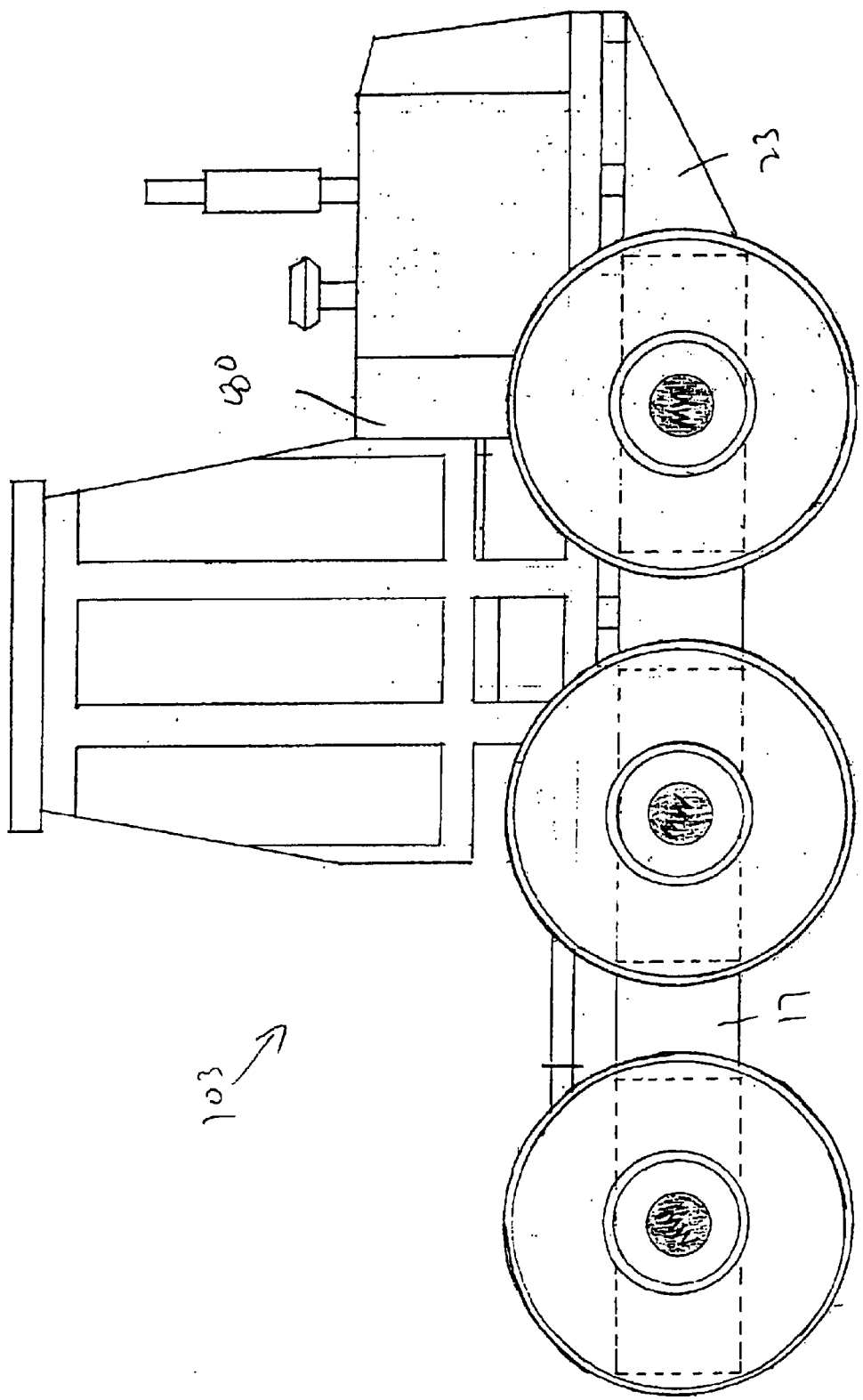

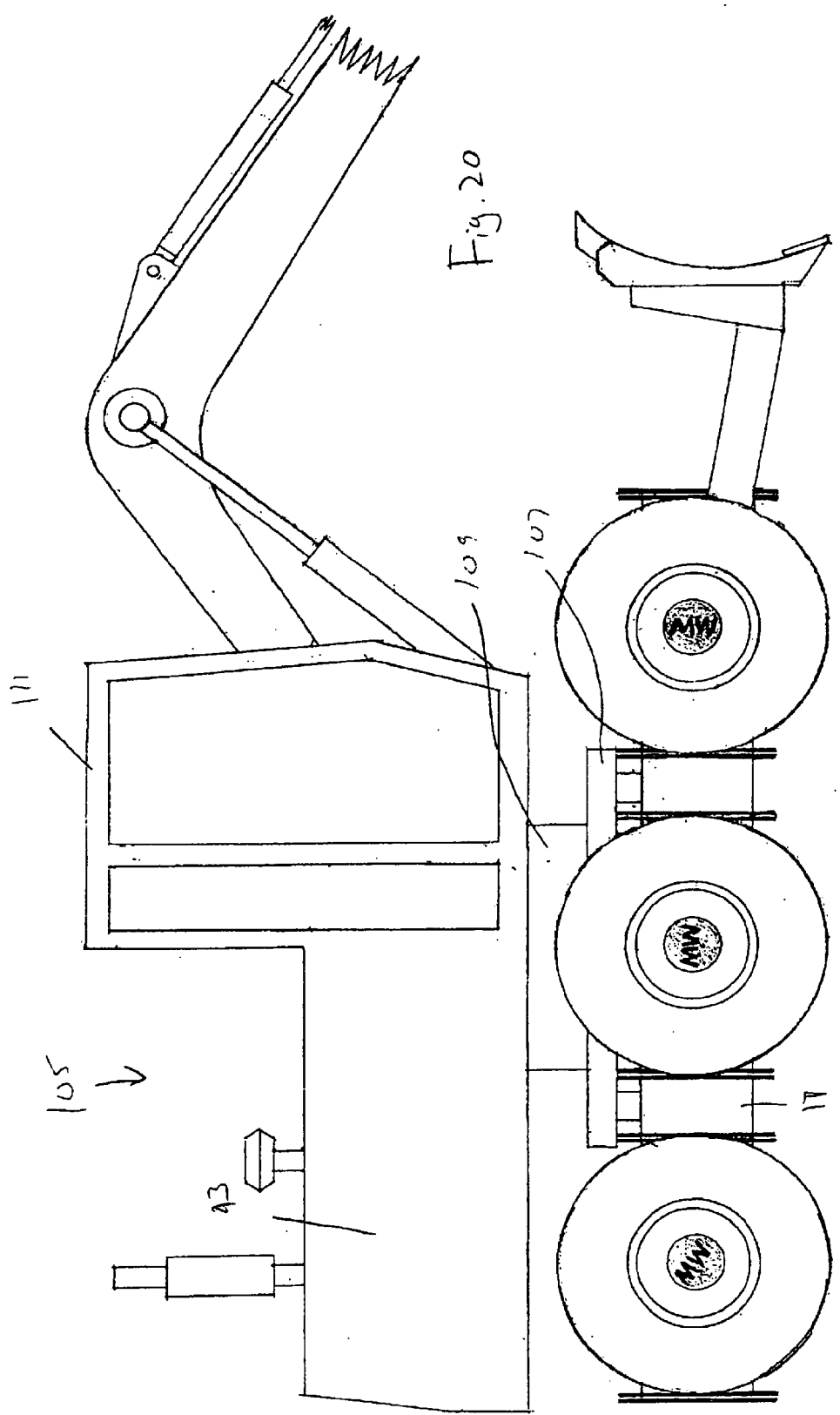

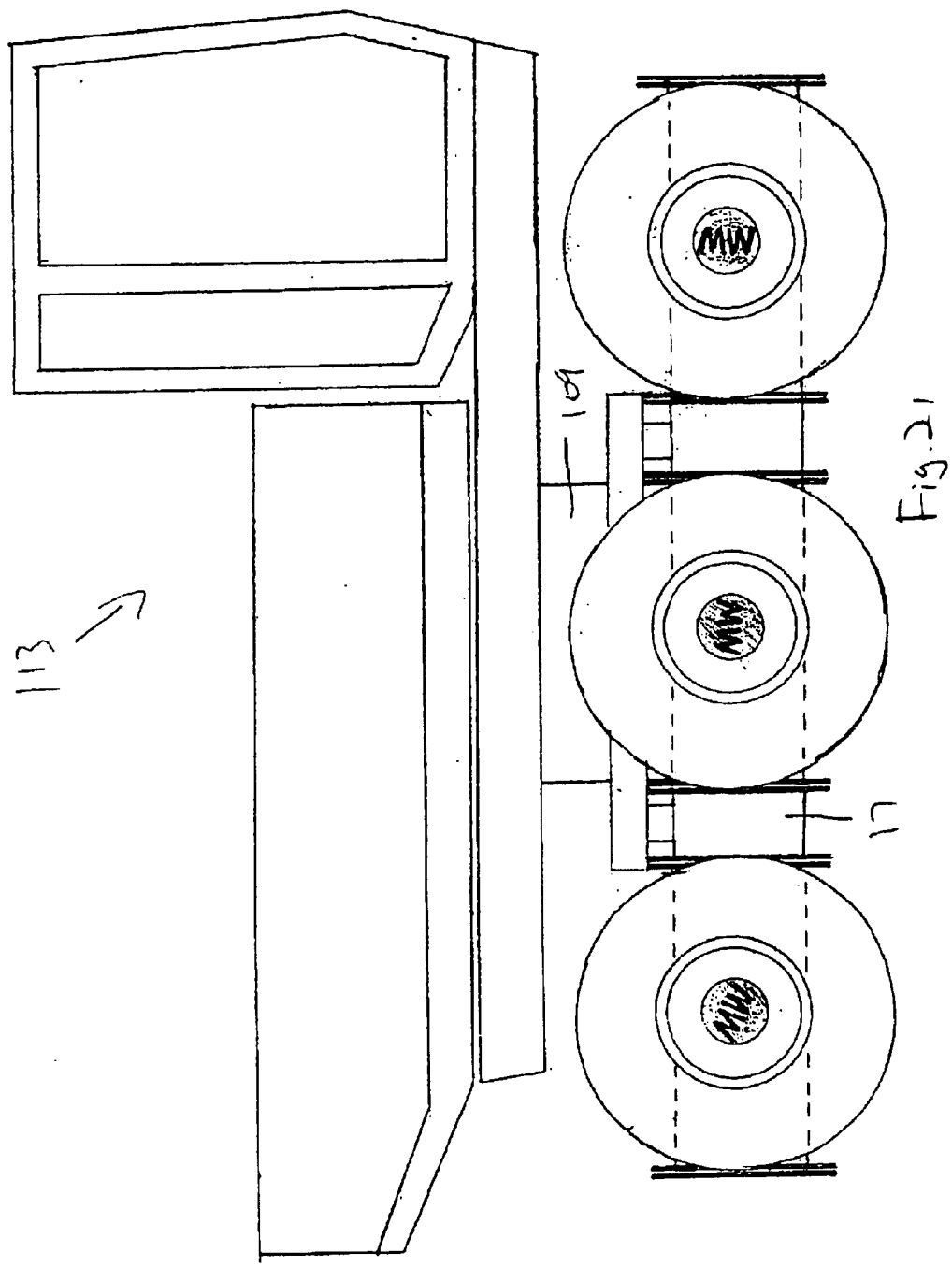

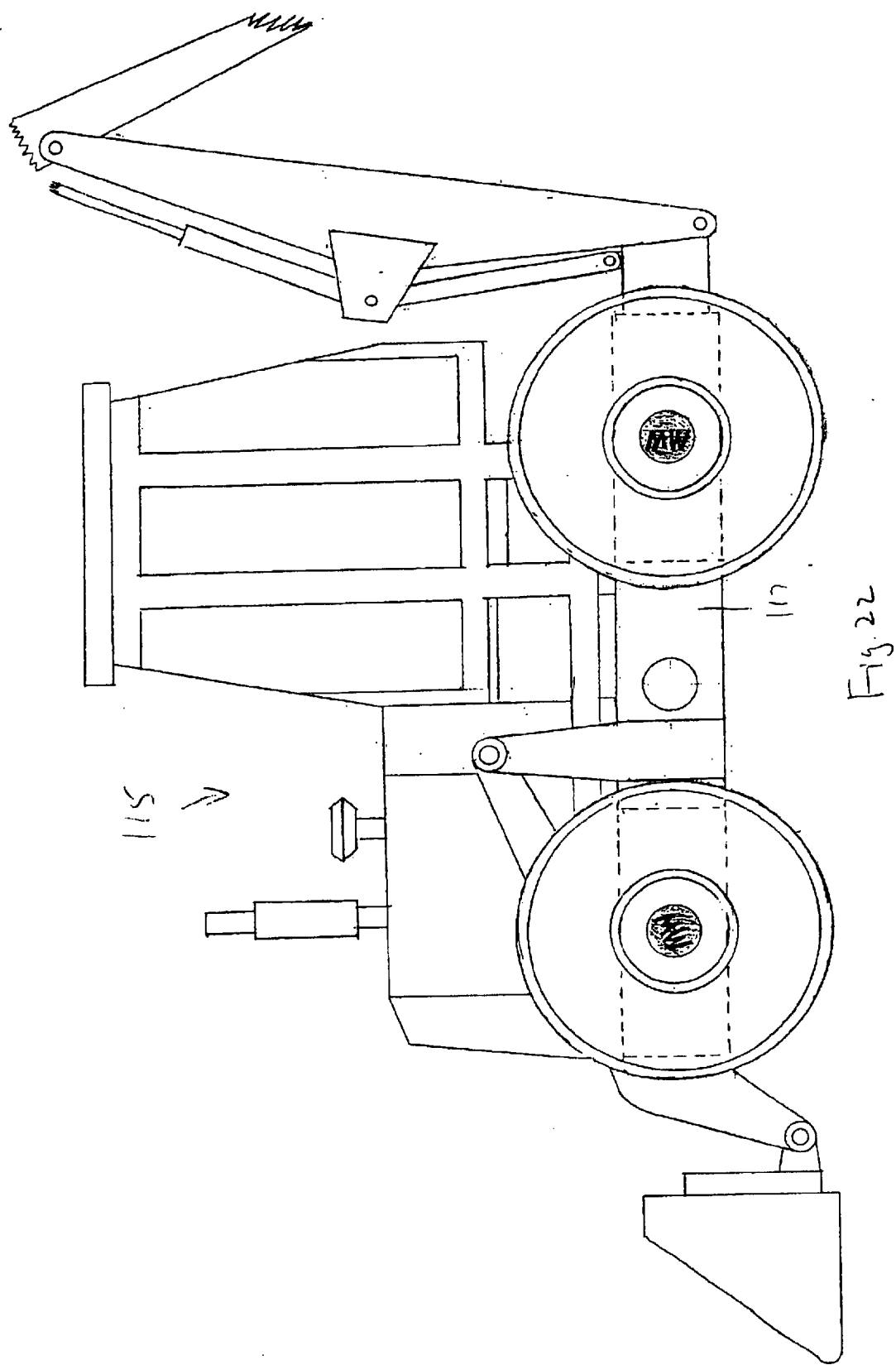

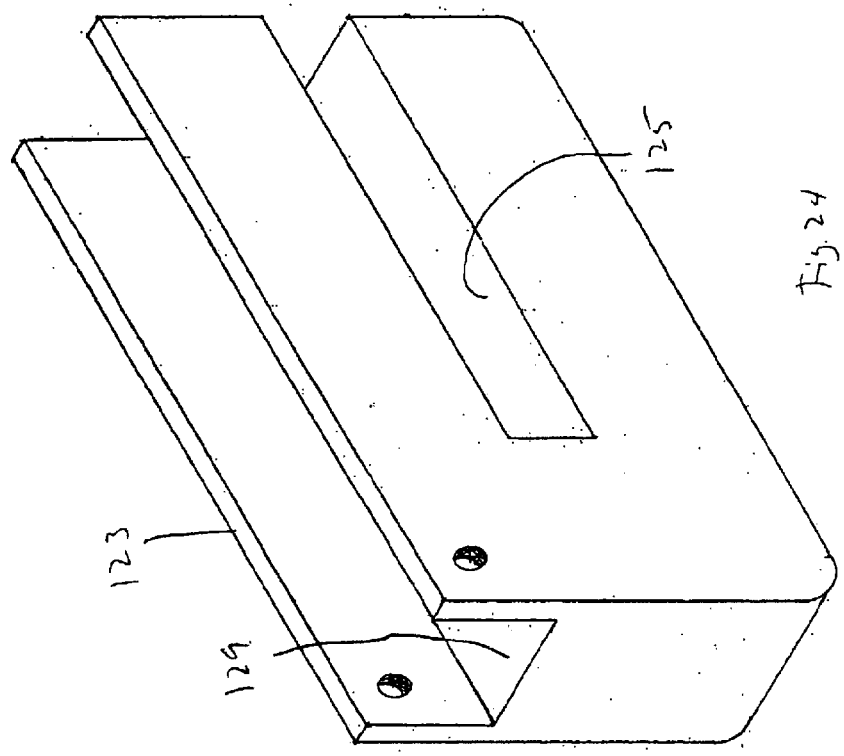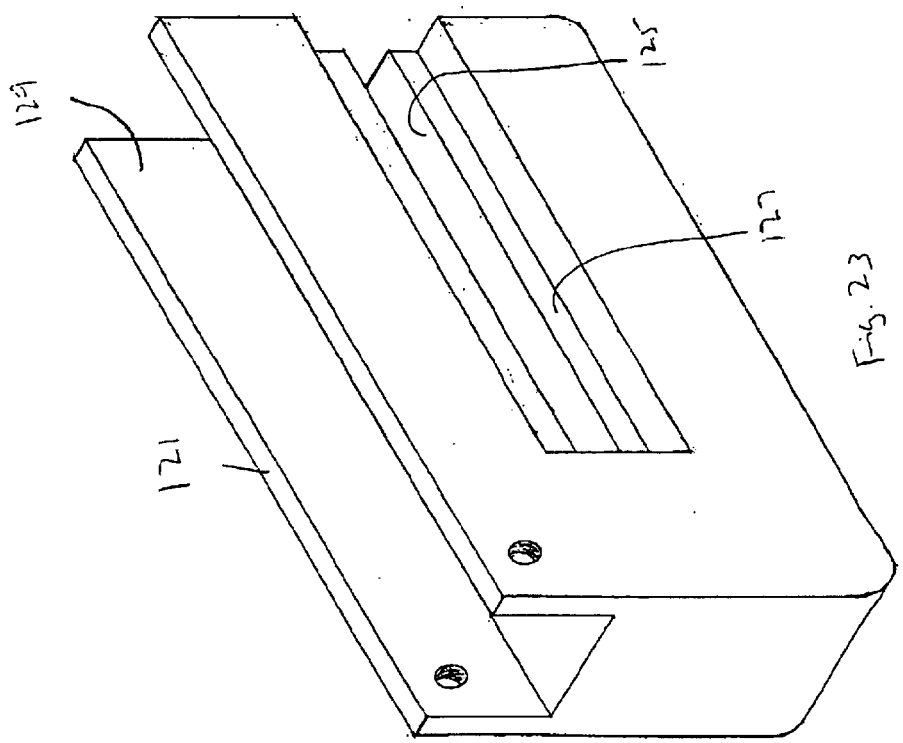

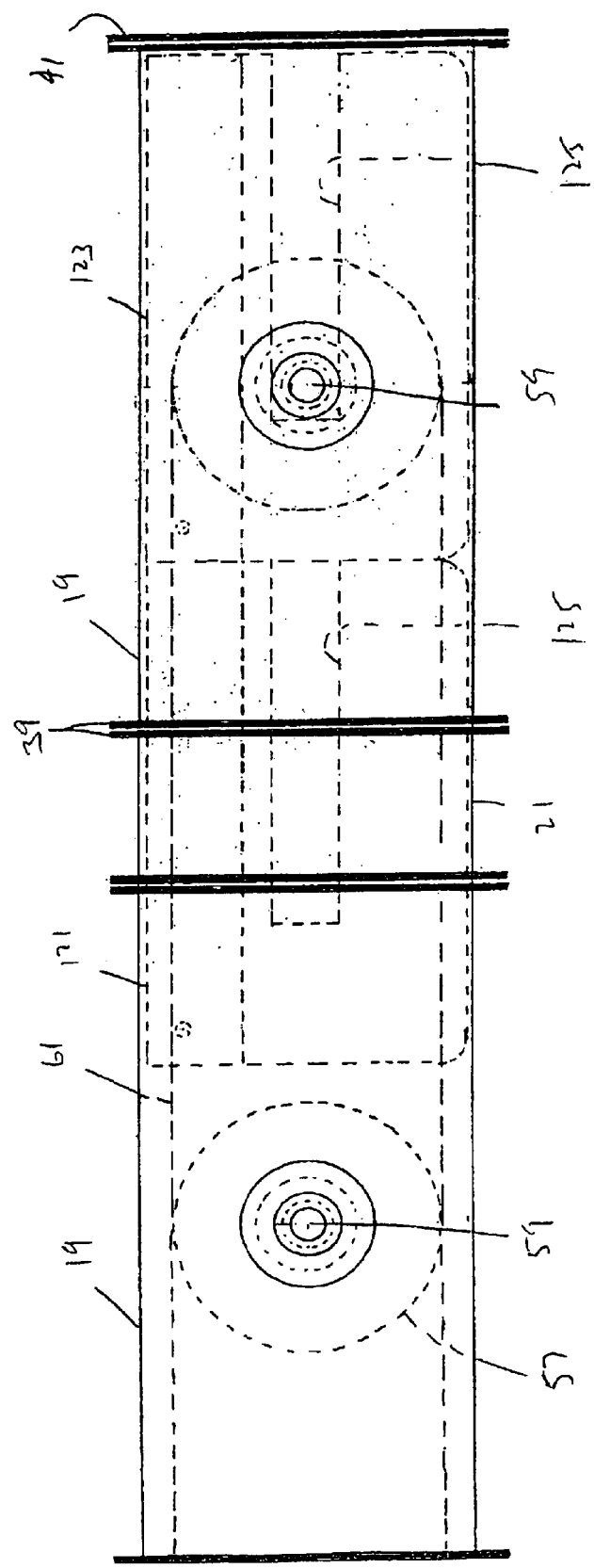

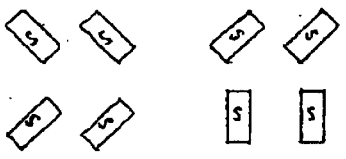
Fig. 27A Circle Steer
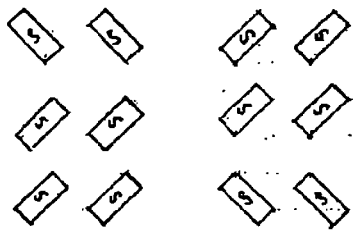
Fig. 27B Tandem Circle Steer
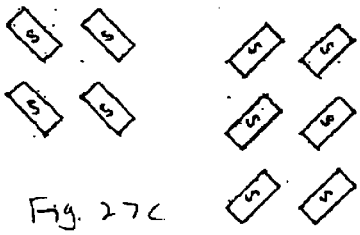
Fig. 27C Crab Steer
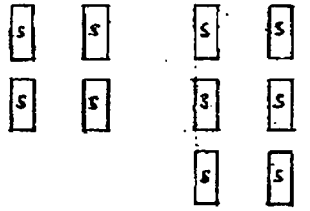
Fig. 27D Skid Steer
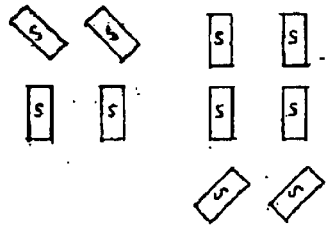
Fig. 27E Front/Rear Wheel Steer
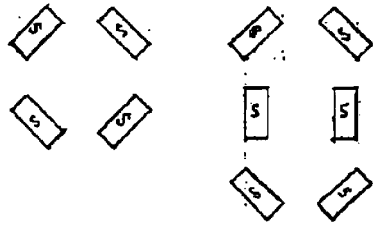
Fig. 27F Counter Rotational Circle Steer

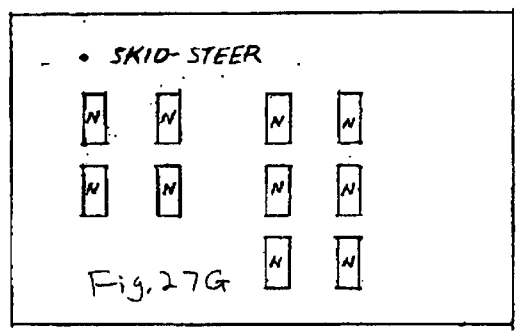
Fig. 27G
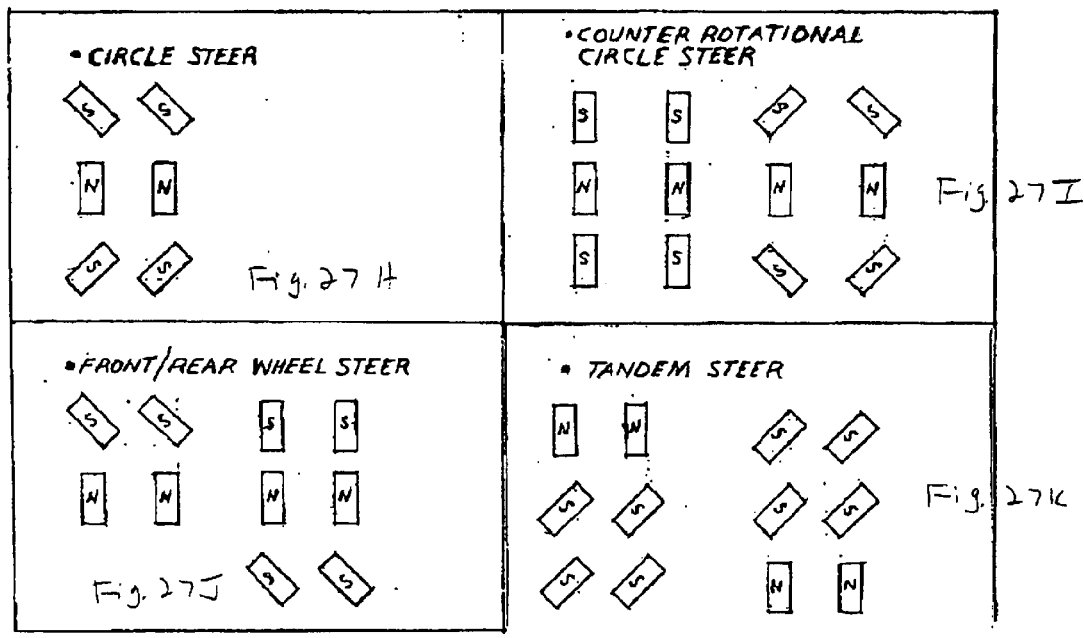

MULTIWHEELED MODULAR RIGID FRAME VEHICLE

BACKGROUND OF INVENTION

1. Field of the Invention

The present invention relates to off-road vehicles having a rigid frame and multiple wheels.

2. Background of the Invention

Construction equipment comes in a variety of types such as wheel and track. Wheel type construction equipment includes, for example, wheel loaders (or tool carriers), crawlers (or dozers), motor graders, tractor loader backhoes, wheel excavators and agricultural tractors.

This wide diversity of wheeled equipment has a large number of parts and components. For example, each vehicle has a frame or chassis. Some vehicles have only four wheels, while others have six or more wheels. Even the same type of equipment can have a different number of wheels. For example, a wheel loader can be designed for four wheels or for six wheels. The four wheel design has a relatively short frame while the six wheel design has a larger frame. In addition, the size of the wheels or tires on the vehicle may be determined by the frame size limitations.

Even with vehicles having the same number of wheels, one type of vehicle may have a longer wheel base than another. For example, a wheeled excavator may have a longer power train wheel base than does a motor grader.

Consequently, the design and construction of wheeled equipment is difficult, as a frame or chassis must be custom designed for each type and model of vehicle.

The design of a frame for a multi-wheeled vehicle is made more difficult by the drive and steering mechanisms for the wheels. The wheels or tires must be able to rotate both forward and backward (reverse). In addition, in some steering applications, the wheels on one side of the vehicle rotate in an opposite direction than the wheels on the opposite side (for example, skid steering). Furthermore, some wheels must be able to turn for steering purposes, either independently or in conjunction with other wheels.

There is a need to simplify the design and construction of frames for wheeled vehicles.

SUMMARY OF INVENTION

It is an object of the present invention to provide wheeled construction equipment with frames having a commonality of parts.

The present invention provides a frame module for use in constructing a frame for an off-highway vehicle, comprising a tank having top, bottom and side walls, with the tank ends open. The ends have first couplings that are structured and arranged to couple the module to another module. At least one wheel cog is located in the tank and mounted on a shaft so as to rotate within the tank, with the shaft extending between side walls. The shaft has a second coupling at one of the side walls that is structured and arranged to couple to a wheel axle assembly.

With the present invention, a frame for a vehicle can be easily designed and built to accommodate a variety of vehicle types and sizes. The modules can be coupled together in the desired configuration.

In accordance with one aspect of the present invention, there is an opening in the top wall, the opening being structured and arranged for receiving a drive chain around the wheel cog.

In accordance with another aspect, the shaft second coupling further comprises a receptacle for receiving an axle of the wheel axle assembly.

In accordance with still another aspect, there is provided a fitting structured and arranged for receiving a steering actuator on the wheel axle assembly.

In accordance with still another aspect, there is provided an inside support wall.

In accordance with still another aspect, the frame module further comprises an opening in the top wall, the opening being structured and arranged for receiving a drive chain around the wheel cog. The shaft has a respective second coupling at each end of the side walls, with the second couplings being structured and arranged to couple to a wheel axle assembly.

The present invention also provides an off-highway vehicle, comprising a rigid frame. A power source is mounted to the frame. The frame comprises at least two modules, with each module having top, bottom and side walls and two ends. Each module has first couplings at each end. The modules are connected together an end-to-end manner by the first couplings. The frame has endmost modules, which endmost modules have the free ends covered, wherein the modules form a tank that can contain a lubricant. Each of the endmost modules having at least one wheel cog rotatably located therein. The wheel cog having second couplings located at the side walls. A primary drive chain extends from the power source through an opening in a top wall of one of the modules and the respective wheel cog. A secondary drive chain extends through the tank from a second wheel cog in the module of the primary drive chain to the next adjacent module having a wheel cog. Wheel axle assemblies are mounted to the second couplings.

In accordance with another aspect the modules are first modules, with each of the first modules comprising a wheel cog and second couplings, the frame further comprising at least one second module interposed between two of the first modules, the second module lengthening the tank between the second couplings.

In accordance with still another aspect, the frame comprises three of the modules. There are two endmost modules and an intermediate module, with the endmost modules having wheel axle assemblies mounted thereto and with the intermediate module lacking wheel axle assemblies, the intermediate module having wheel cogs coupled to the wheel cogs in the endmost modules by drive chains.

In accordance with still another aspect, the receptacles in the intermediate module are covered.

In accordance with still another aspect of the invention, the frame comprises three of the modules, there being two endmost modules and an intermediate module. The endmost and intermediate modules have wheel axle assemblies mounted thereto. The intermediate module have wheel cogs coupled to the wheel cogs in the endmost modules by drive chains.

In accordance with still another aspect of the present invention, the modules are first modules. The frame further comprises at least one second module interposed between two of the first modules. The second module have first couplings and lengthen the tank.

In accordance with still another aspect of the present invention, a counterweight is located in one of the endmost modules. An actuator is coupled to the counterweight, wherein the actuator moves the counterweight inside of the frame.

In accordance with still another aspect of the present invention, the modules are first modules having a wheel cog and second couplings. The frame further comprises at least one second module coupled to one of the first modules. The second module has first couplings and an attachment for a tool.

The present invention also provides a method of constructing a rigid frame for an off-highway vehicle. A set of modules is provided, with each of the modules having two ends and a wheel cog rotatably mounted therein. At least two of the modules are coupled together in an end-to-end manner. The wheel cogs and the coupled modules are coupled together with one or more drive chains. Wheel axles are rotatably coupled with at least some of the wheel cogs in the coupled modules.

In accordance with one aspect of the present invention, the providing of a set of modules further comprises providing a first set of modules having the same length between their respective ends. A second set of modules is provided. At least two modules from the first set and a module from the second set are coupled together in an end-to-end manner, with the module from the second set being between the modules from the first set.

In accordance with another aspect of the present invention, the step of coupling at least two of the modules together in an end-to-end manner further comprises coupling a number of the modules together so that the frame has a predetermined length.

In accordance with another aspect of the present invention, the step of coupling at least two of the modules together in an end-to-end manner further comprises coupling a number of the modules together so that the frame has a predetermined wheel base.

In accordance with another aspect of the present invention, the step of coupling at least two of the modules together in an end-to-end manner further comprises coupling a number of the modules together so that the frame can accommodate a predetermined wheel diameter.

In accordance with another aspect of the present invention, there is provided a cab and engine on a platform, which platform is mounted to the frame.

The present invention also provides an off-highway vehicle having a rigid frame and a power source mounted to the frame. The frame has at least one tank for containing a lubricant. A drive arrangement is located in the tank, with the drive arrangement comprising wheel cogs and drive chains. A counterweight is located in the tank and is moveable therein. An actuator is coupled to the counterweight, wherein the actuator moves the counterweight.

In accordance with one aspect of the present invention, the counterweight is located in a space that is adjacent to a portion of the drive arrangement.

BRIEF DESCRIPTION OF DRAWINGS

FIG. 7 is a top plan view of a chain tank module equipped with a power drive component, showing the associated steerable and nonsteerable axle assemblies.

FIG. 8 is an end view of the chain tank module of FIG. 6.

FIG. 10 is a top plan view of the frame and engine of the wheel loader of FIG. 9.

FIG. 11 is a side elevational view of the frame and engine of the wheel loader of FIG. 9.

FIGS. 23 and 24 are isometric views of counterweights.

DETAILED DESCRIPTION

The present invention provides simplicity in the design and manufacture of a variety of wheeled off-highway vehicles. Off-highway vehicles include construction equipment such as wheel loaders, dozers, motor graders, loader backhoes, excavators, agricultural tractors and so on. The present invention is applicable to vehicles that utilize wheels instead of tracks for mobility.

Such vehicles come in a variety of sizes and wheel configurations. For example, four wheeled vehicles have a wheel base that is shorter than six wheel vehicles. Even among vehicles having the same number of wheels, one type of vehicle might have a longer wheel base than the other.

The present invention provides a modular frame, chassis or vehicle platform. The frame is constructed from modules to achieve the desired width, length, number of wheels, spacing between the wheels and other characteristics. Once constructed, the engine, drive components and cab are assembled onto the frame, the axles are attached and the wheels are mounted. The interchangeable modules provide low cost and flexibility to a manufacturer. This is because the number of different components needed to make a variety of frames is reduced. By utilizing interchangeable modules, a wide variety of vehicles, within a horsepower and size range, can be manufactured. In addition, modules allow a vehicle to be converted from one type of frame to another type. For example, the frame can be lengthened by adding modules, or shortened by removing modules. Modules can even be removed from one vehicle and used on another.

By using a set of standard frame modules, the design and construction of multiple type vehicles is greatly simplified.

Figure 1:
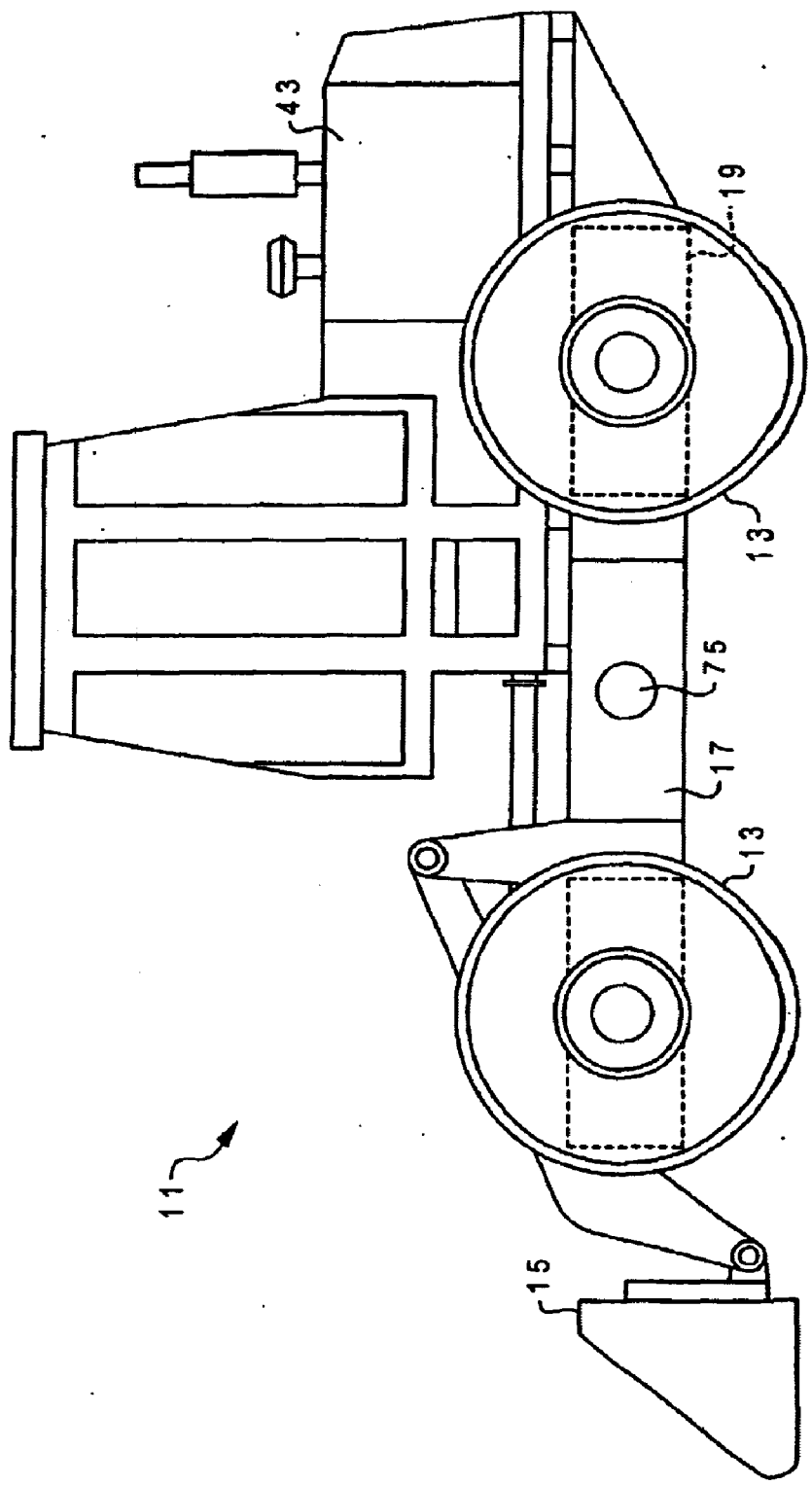
FIG. 1 is a side elevational view of a four wheel loader incorporating the present invention, in accordance with a preferred embodiment.

In FIG. 1, there is shown a wheel loader 11 having four wheels 13. The loader has a bucket 15 mounted to a frame 17. The bucket is articulated so as to move up and down and in rotation (to load or dump).

Figure 2:
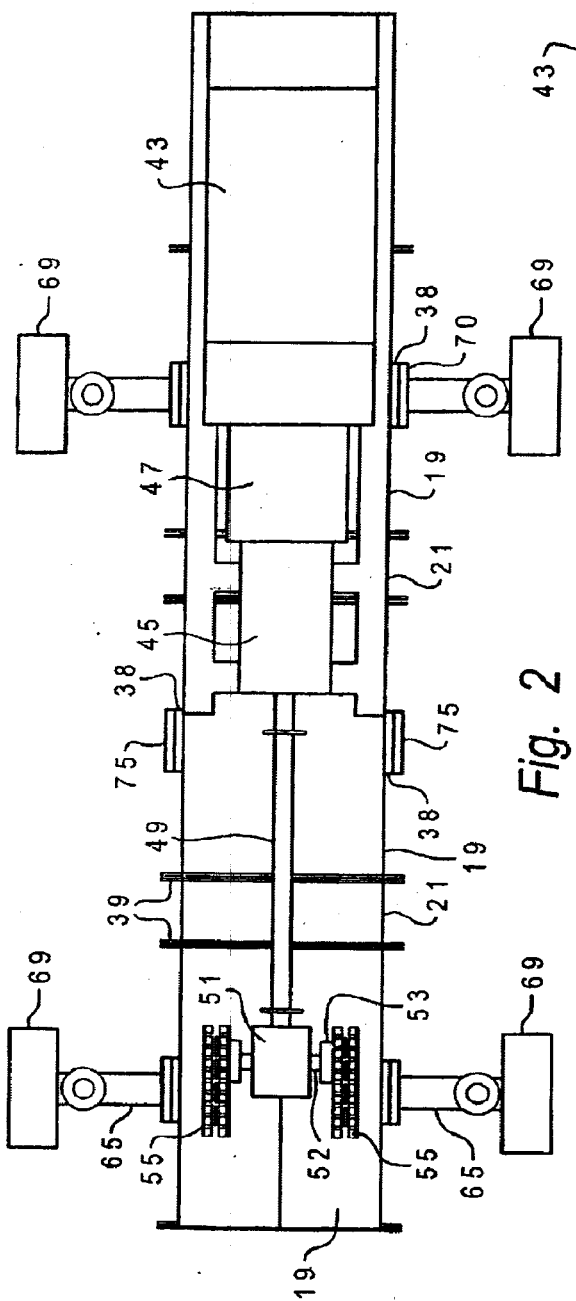
FIG. 2 is a top plan view of the frame and engine of the wheel loader of FIG. 1.
Figure 3:
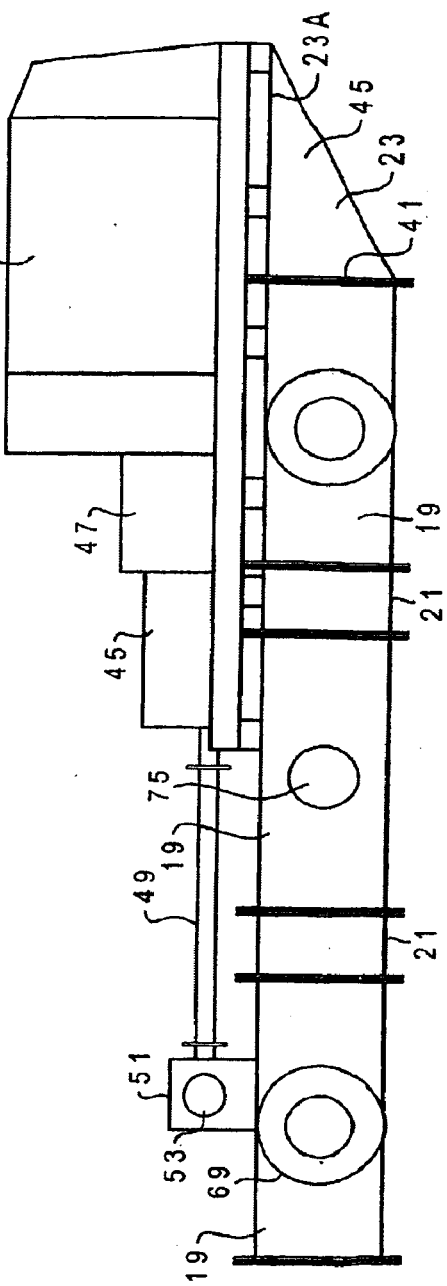
FIG. 3 is a side elevational view of the frame and engine of the wheel loader of FIG. 1.
Figure 4:
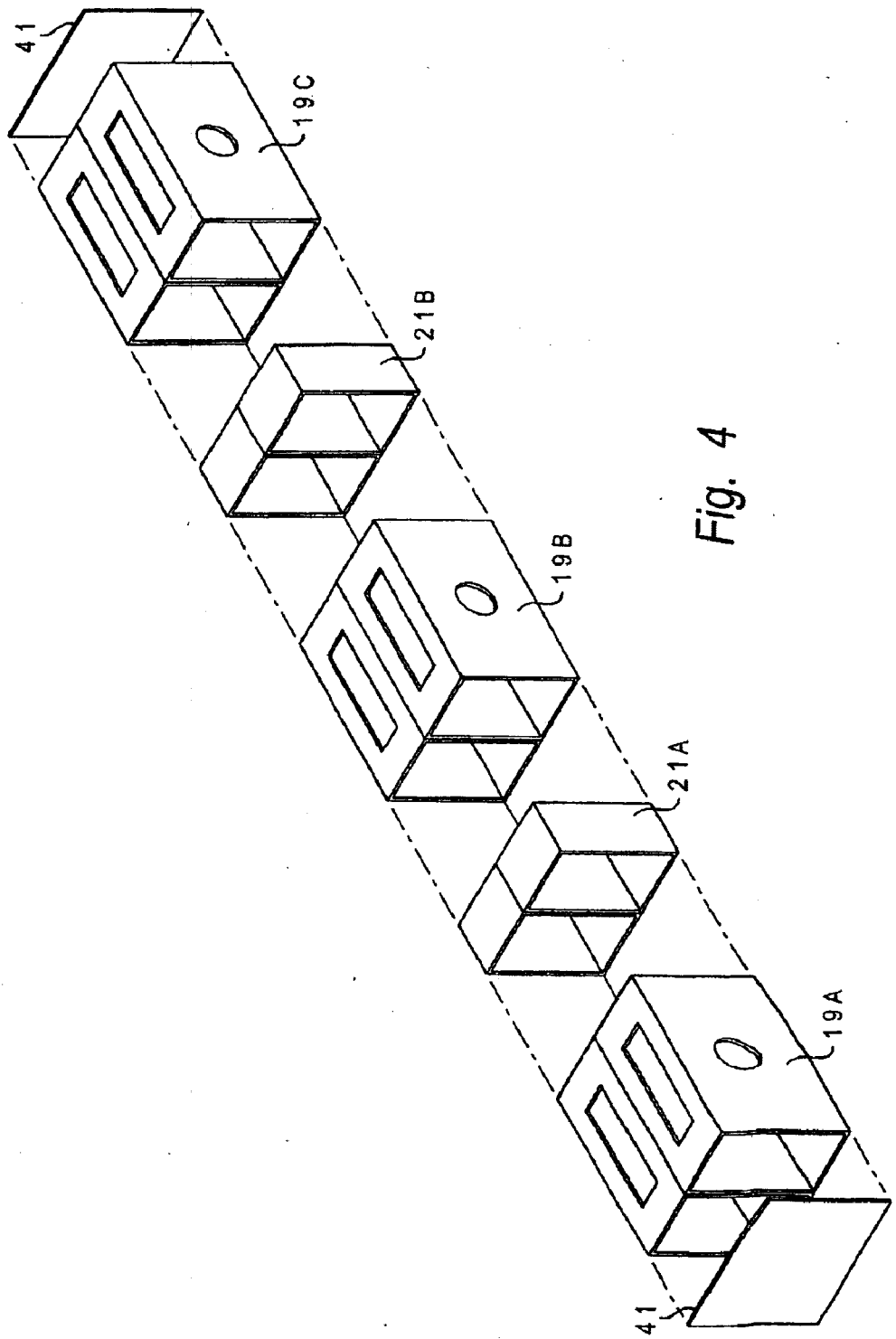
FIG. 4 is an isometric exploded schematic view of the frame.

FIGS. 2 and 3 show the frame 17 of the wheel loader of FIG. 1 (the wheels 13 are not shown in FIGS. 2 and 3). The frame has two types of modules, namely chain tank modules 19 and adapter modules 21. The wheel loader frame shown in FIGS. 1–4 utilizes three chain tank modules 19, two adapter modules 21 and an extension unit 23. Each chain tank module 19 is adapted to receive an axle for mounting a wheel 13, while each adapter module 21 serves as a spacer between two chain tank modules 19.

Figure 5:
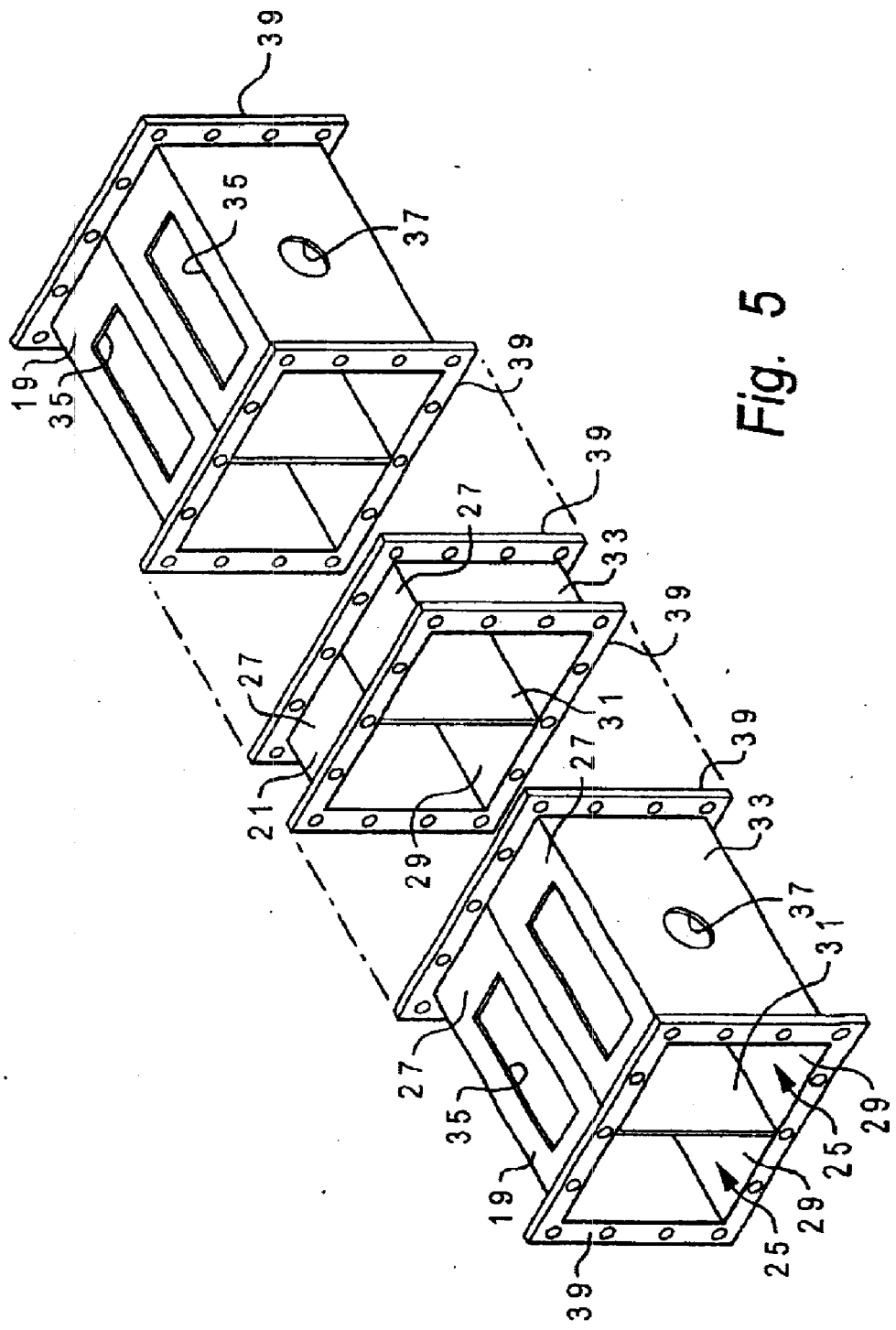
FIG. 5 is an isometric exploded view of a segment of a frame showing chain tank modules and an adapter module.

Referring to FIG. 5, each chain tank module 19 includes two chain tanks 25 mounted side by side. Each chain tank is rectangular in cross-sectional shape, having a top wall 27, a bottom wall 29, an inner side wall 31 and an outer side wall 33. The two inner side walls 31 are bolted or otherwise coupled together to couple the two chain tanks together side by side. Alternatively, a single inner side wall 31 can be shared by the two side by side chain tanks. The top wall 27 of each chain tank has an opening 35 that is, if need be, covered by a hatch. The outer side wall 33 of each chain tank has a circular opening 37 for either receiving an axle or a hatch cover 75 (see FIG. 2). As how in FIGS. 2 and 7, the outer side walls 33 are provided with reinforced frame receptacles 38 around the openings 37. The ends of the chain tank module have an outwardly extending flange 39 along the top, outer sides and bottom. The inner side wall ends need not have a flange. The flanges 39 have openings therethrough for receiving bolts. The flanges allow two modules to be bolted together in an endwise arrangement. The flanges could extend inwardly rather than outwardly as shown. Outwardly extending flanges are easier to access. Access to inwardly extending flanges would be through the top wall opening 35 or through an end of the module. The chain tank modules are made of equal length, as measured between the flanges 39. If required, chain tank modules of several lengths could be manufactured and utilized to make vehicle frames of different respective size class ranges as pertains to horsepower and weight.

Chain tank modules are also equipped with wheel cogs 57 (see FIG. 6) which will be discussed in more detail hereinafter. The wheel cogs 57 accept drive chains.

Each adapter module 21 is substantially similar to the chain tank module 19, except openings in the top and outer side walls 27, 33 are not needed and wheel cogs 57 are not provided. The adapter modules 21 tend to be shorter in length than do chain tank modules. Adapter modules can be made in a number of lengths to accommodate spacing between wheel 13 axles.

The chain tank modules 19 and the adapter modules 21 are constructed of thick steel plates or other suitable material. Each module forms a strong rigid member, capable of bearing the loads experienced in off-highway vehicle use. The flanges 39 serve to stiffen the boxlike modules as well as couple the modules together. If need be, other stiffeners could be used to strengthen the modules; such stiffeners may be required for larger heavy duty vehicles. Alternatively, other types of couplings could be used to couple the modules together. In the preferred embodiment, the modules are particularly well suited for vehicles in the 18,000–23,000 lbs. size range (where the thickness of the walls 27, 29, 31, 33 can be as thick as one inch). However, the modular frame can be used on vehicles in the 10,000–220,000 lbs. size range. Such an example of size ranges is not intended as a limitation, as the invention could be used on smaller or larger vehicles.

In the description herein, the modules 19, 21 have two side by side chain tanks or adapter tanks. This is to provide a module of a desired width as well as to provide an inner side wall 31 for strength. The module need not have two tanks; it may have only a single tank, or it may have more than two tanks by virtue of additional inner side walls 31 or other members for strength and support.

To construct a frame 17, a set of modules is manufactured or otherwise provided. The modules can be newly constructed or salvaged from existing vehicle frames. The appropriate number and type of modules are selected. With just in time manufacturing procedures, the appropriate number and type of modules is manufactured. The modules are bolted together in the desired configuration and length. For example, referring to FIGS. 4 and 5, a first chain tank module 19A is bolted to a first adapter module 21A. The modules are brought together end to end to align the bolt holes in the flanges 39. A seal or gasket is placed between the flanges and the modules are bolted together. A second chain tank module 19B is coupled to the first adapter module 21A, a second adapter module 21 B is coupled to the second chain tank module and a third chan tank module 19C is coupled to the second adapter module. The chain tank modules are all oriented with the top walls 27 facing up. The top walls 27 in the modules 19, 21 are coplanar. Likewise, the other walls (bottom, outer side walls) are also coplanar with respect to each other. End plates 41 are coupled to the free ends of the first chain tank module 19A and the third chain tank module 19C. The end plates seal the module ends.

The wheel cogs 57 are coupled together with the drive chains 61. Wheel axles are also coupled to the frame and the cab and power skid are mounted to the frame, as will be discussed in more detail below.

The chain tank modules 19 are laterally symmetric. Thus, either end of a module 19 can connect to any end of any other modules 19, 21.

A modified end plate, or extension unit 23, is shown in FIG. 3. The extension unit has an end plate 41 and also has a top plate 23A joined to the end plate. The top plate 23A is coplanar with the top walls 27 of the modules 19, 21. Supports 45 extend between the end and top plates. The extension unit is designed to add length to a frame without the need for a drive mechanism. As an alternative to the extension unit, an adapter module 21 with an end plate 41 could be used.

The drive mechanism will now be described with reference to FIGS. 2, 3 and 6. The present invention utilizes drive and steering mechanisms that are discussed in my U.S. Pat. No. 4,782,906, the disclosure of which is incorporated by reference herein. As shown in FIGS. 2 and 3, an engine 43 or prime mover is mounted on top of the frame 17. A transmission 45 is coupled via a torque converter 47 to the mechanical output of the engine. A drive shaft 49 extends from the transmission to a differential steering device 51. In U.S. Pat. No. 4,782,906, dual transmissions are utilized. In the present invention, a dual transmission is not needed and the differential steering device 51 is instead utilized. The differential steering device 51 has two output shafts 52, one for each side of the frame. A primary planetary reduction hub 53 is coupled to each output shaft 52. A primary drive chain 55 extends around a respective primary planetary reduction hub 53 and through the top wall opening 35 (see FIG. 5) into the respective chain tank 25.

Figure 8A:
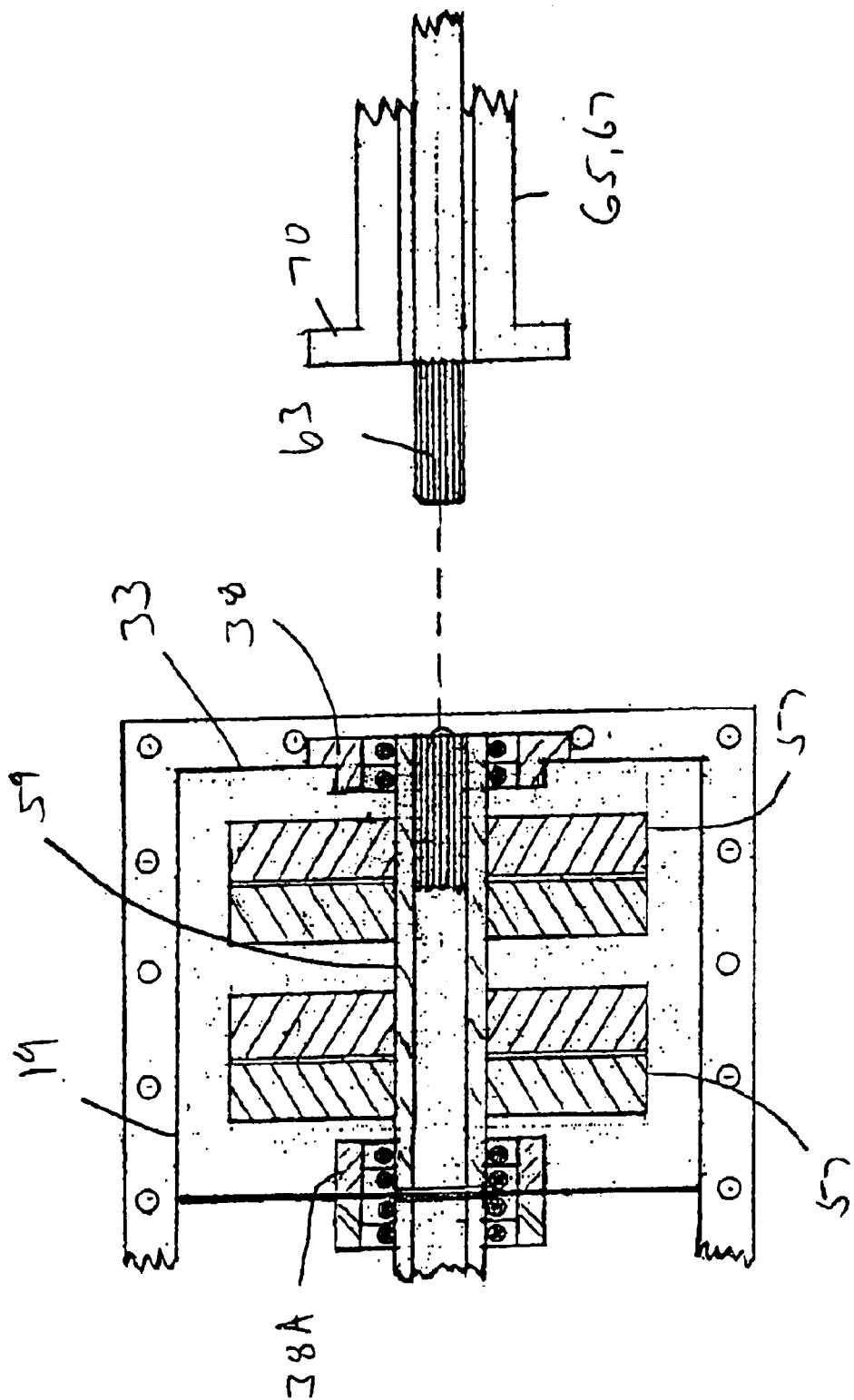
FIG. 8A is a transverse cross-sectional view of a chain tank module showing the hollow shaft and receptacle.
Figure 6:
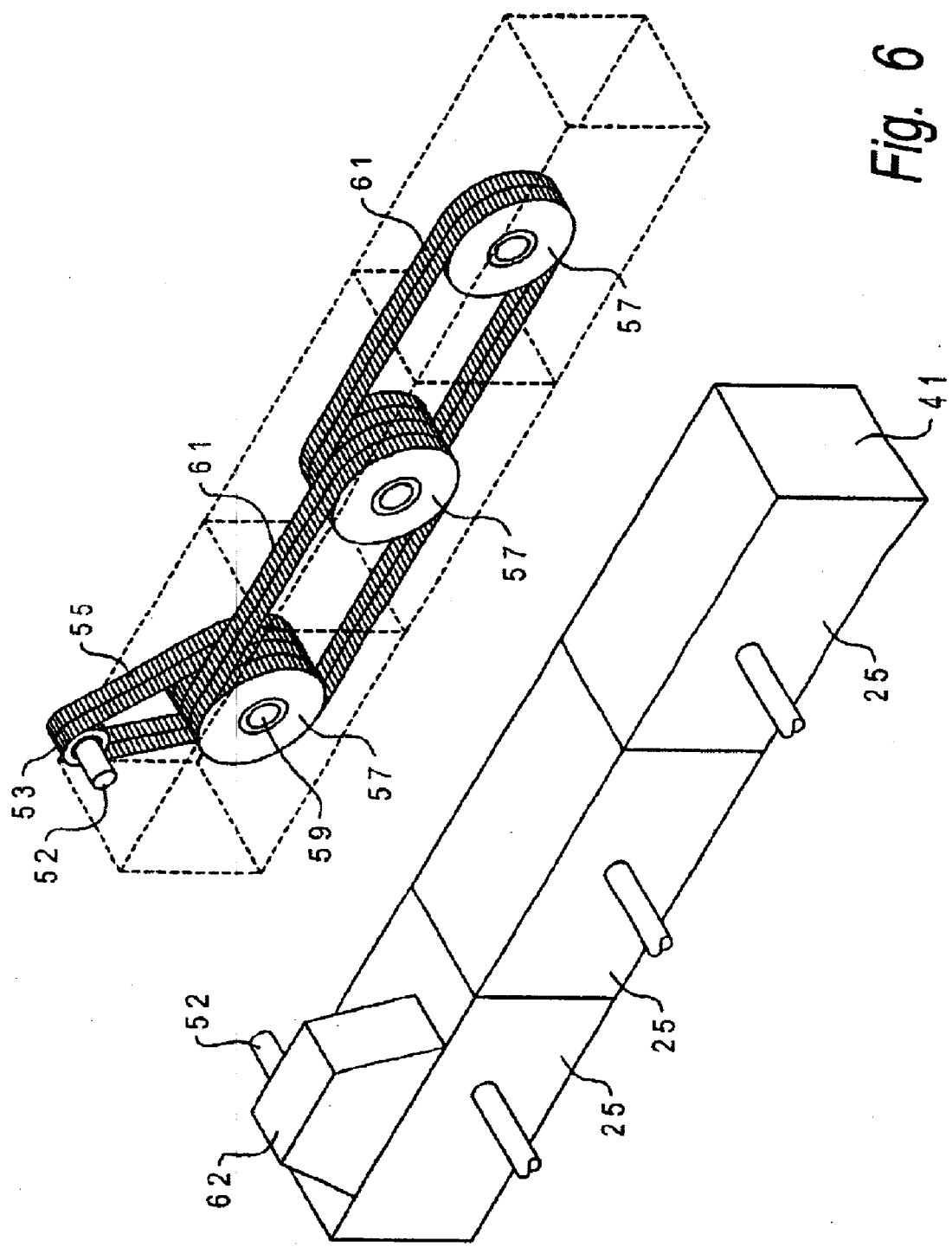
FIG. 6 is an isometric view showing the chain tanks of a frame exploded laterally, with one side of the chain tanks cut away to show the chain drive mechanism.
Figure 8A:
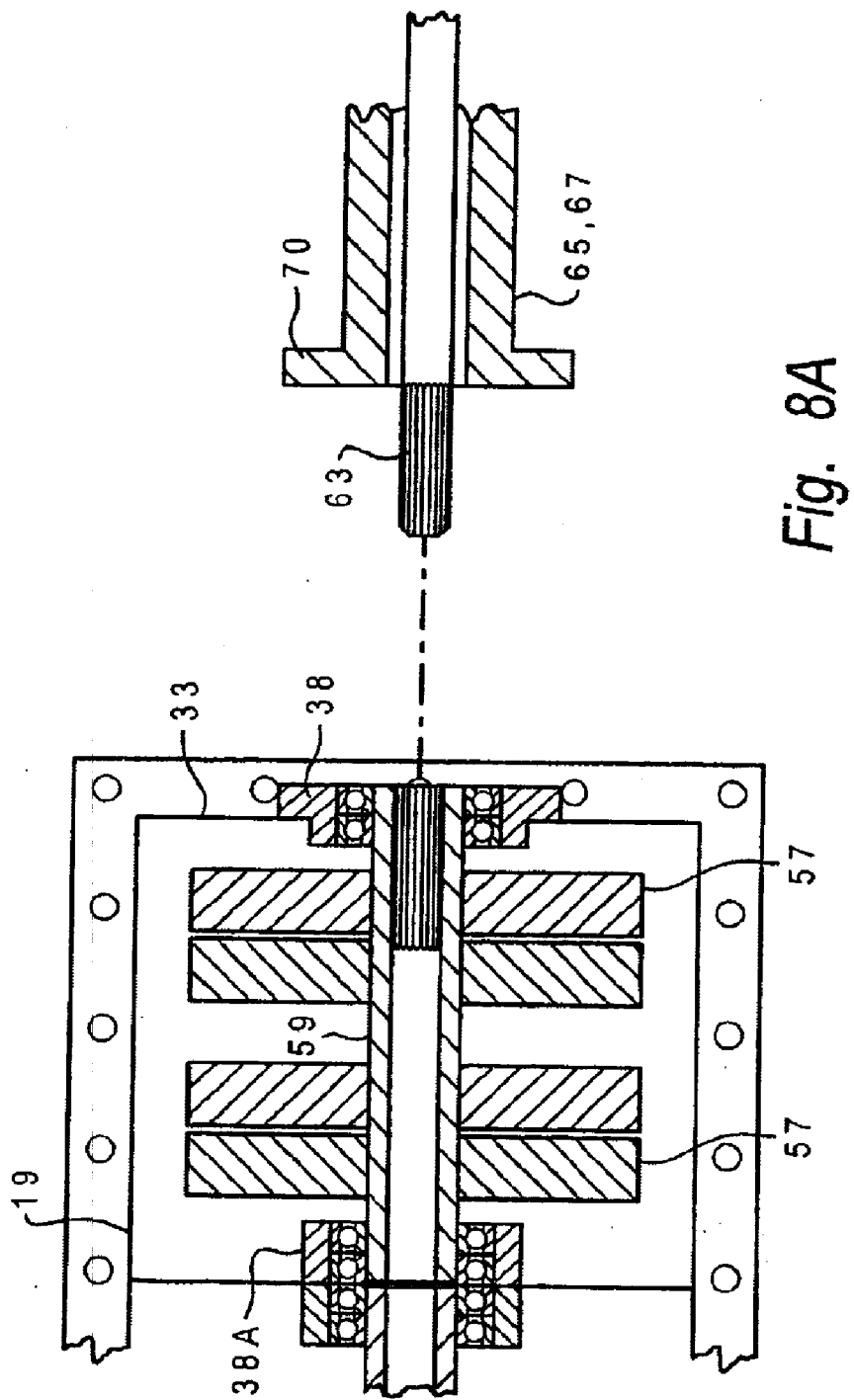

Each chain tank module 19 has one or more wheel cogs 57 or sprockets located therein (see FIGS. 6 and 8). The wheel cogs 57 are coupled to a shaft 59 that is in turn rotatably mounted to the side walls 31, 33 of the chain tank by bearings 60. The shaft 59 has a second wheel cog 57 coupled thereto. As shown in FIG. 6, a secondary drive chain 61 extends around the second wheel cog and to a wheel cog 57 in the second chain tank located end-to-end with the first chain tank. Still another secondary drive chain 61 extends around a wheel cog in the second chain tank to a wheel cog 57 in the third chain tank. All of the wheel cogs that are chained together are driven in unison in the same direction.

Adapter modules 21 are not provided with wheel cogs 57; the drive chains merely pass through the adapter modules. The drive chains can be lengthened or shortened according to the distance between adjacent wheel cogs 57 in the modules 19.

The primary and secondary drive chains 55, 61 are conventional and commercially available and are of the roller type. The use of drive chains in construction equipment is well known. A closed splash guard cover 62 is located over the primary drive chain 55 as the chain exits the chain tank.

The frame 17 forms two side by side elongated tanks, one for the left side wheels and the other for the right side wheels of the vehicle. FIG. 6 shows the frame without the use of adapters. Each tank is capable of holding a quantity of lubricant, such as oil. Typically, the tank is filled with enough oil so that the bottom portions of the drive chains are immersed.

Referring to FIG. 8A, each outer side wall 33 of the chain tank module 19 has mounted thereto a reinforced frame receptacle 38. The inner side wall 31 has mounted thereto a receptacle 38A. The shaft 59 is mounted by bearings to the receptacles 38, 38A, which receptacles are welded to the side walls. The shaft 59 is a hollow tube, with the outer ends thereof splined. The rotary power of the wheel cogs 57 and shaft 59 can be tapped by inserting an axle 63 into the end of the shaft 59 and bolting the flange 70 to the receptacle 38. If a receptacle 38 is not to be used by an axle, the cover plate 75 is bolted on. The axle 63 rotates within the axle assembly 65, 67. As shown in FIG. 8, each side of the module 11 has a shaft 59. The two shafts 59 are independent of one another. This allows the wheel on one side of the module to counter-rotate relative to the wheel on the other side. Such counter-rotation is useful in certain types of steering (for example, skid steering).

The splined axle 63 is part of a bolt on axle assembly 65, 67 (FIGS. 7 and 8) The axle assemblies each have a hub 69 for receiving a wheel 13. The hub 69 has a secondary planetary reduction mechanism. The assembly has a flange 70 for bolting onto the fixed wall-mounted receptacle 38.

Figure 9:
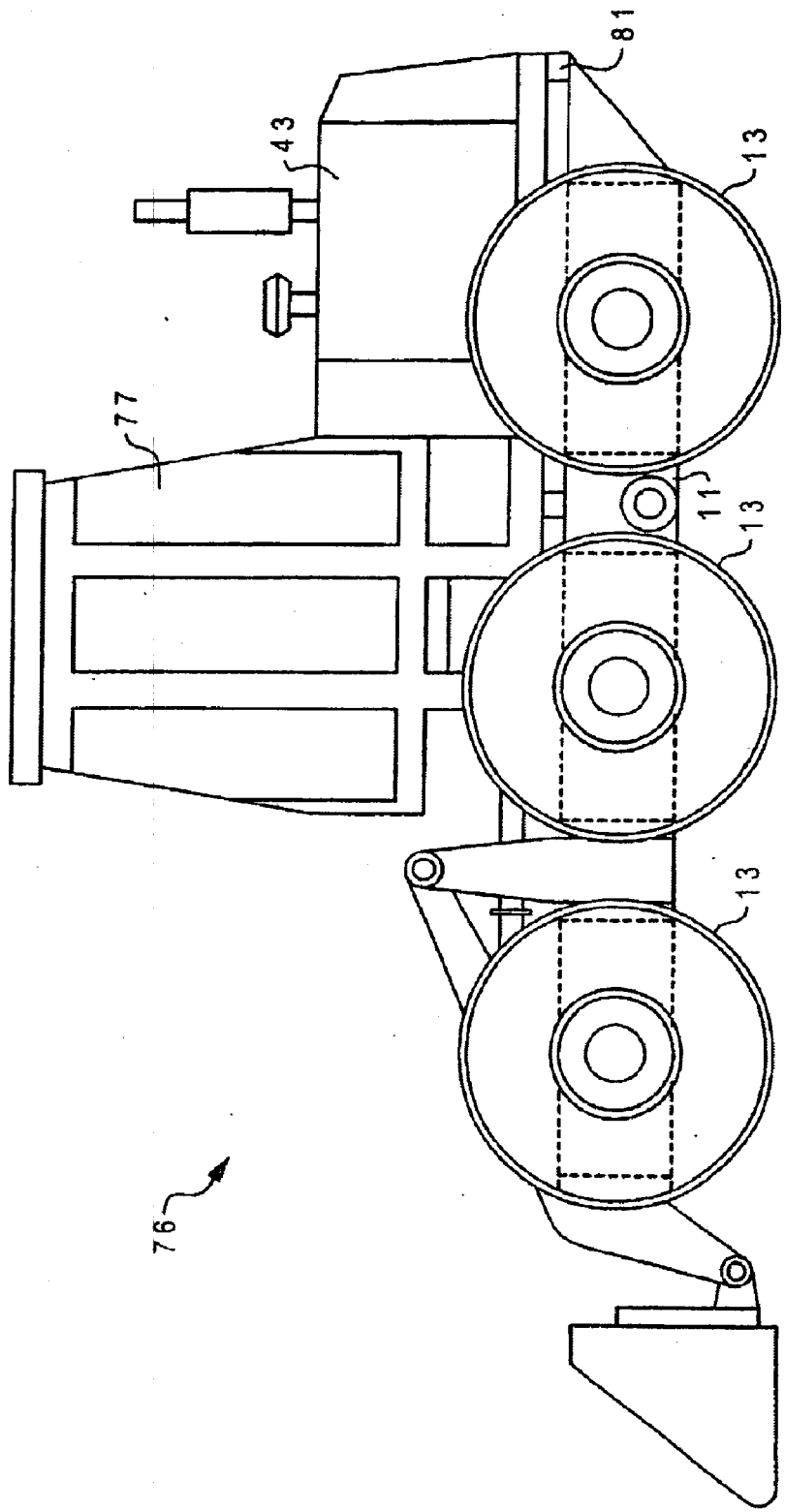
FIG. 9 is a side elevational view of a six wheel loader.

The axle assembly can be steerable 65 (shown on the right side of FIGS. 7 and 8) or nonsteerable 67 (shown on the left side of FIGS. 7 and 8). (FIGS. 7 and 8 show steerable and nonsteerable axle assemblies on a single module 19 for illustrative purposes. In actual practice, a module would be equipped with one type or the other, but not both.) in the steerable axle assembly 65, the hub 69 can be pivoted about a vertical pin 71. A steering actuator 73 is provided. One end of the actuator 73 is pivotally coupled to the module 19 at a fitting 74. The steering actuators 73 are controlled by the vehicle operator, in accordance with the particular steering scheme utilized by the vehicle (e.g. front (or rear) wheel, circle, tandem circle, counter-rotational circle, crab or skid). The steering actuators 73 are typically hydraulically actuated. In the nonsteerable axle assembly 67, the hub does not pivot. If a chain tank module 19 is not to be coupled to an axle assembly, 65, 67, the opening 37 is covered 75. As shown in FIGS. 2 and 3, the intermediate, or middle, chain tank module has no wheels couple thereto. Only the endmost chain tank modules have wheels, making the vehicle a four wheel vehicle. In FIGS. 9–10, a six wheel loader 76 is shown. Each chain tank module 19 has wheels coupled thereto.

Thus, the wheels 13 are coupled with the respective wheel cogs 57 by way of the axle assemblies 65, 67, the receptacles 38 and the shafts 59. Other coupling arrangements could also be utilized.

The wheel base of the frame 17 can be designed by using chain tank modules 19 in combination with adapter modules 21. To increase the distance between two adjacent wheels, an adapter module 21 is located between two chain tank modules. To provide a shorter distance, no adapter module is used. The adapter modules can be made in several lengths to provide more variability in frame design. Thus, the frame can be designed for smaller or larger wheels or tires.

In addition, a vehicle can be easily converted from a four wheel vehicle to a six wheel vehicle and vice versa by adding or removing axle assemblies from the middle chain tank modules.

Figure 12:
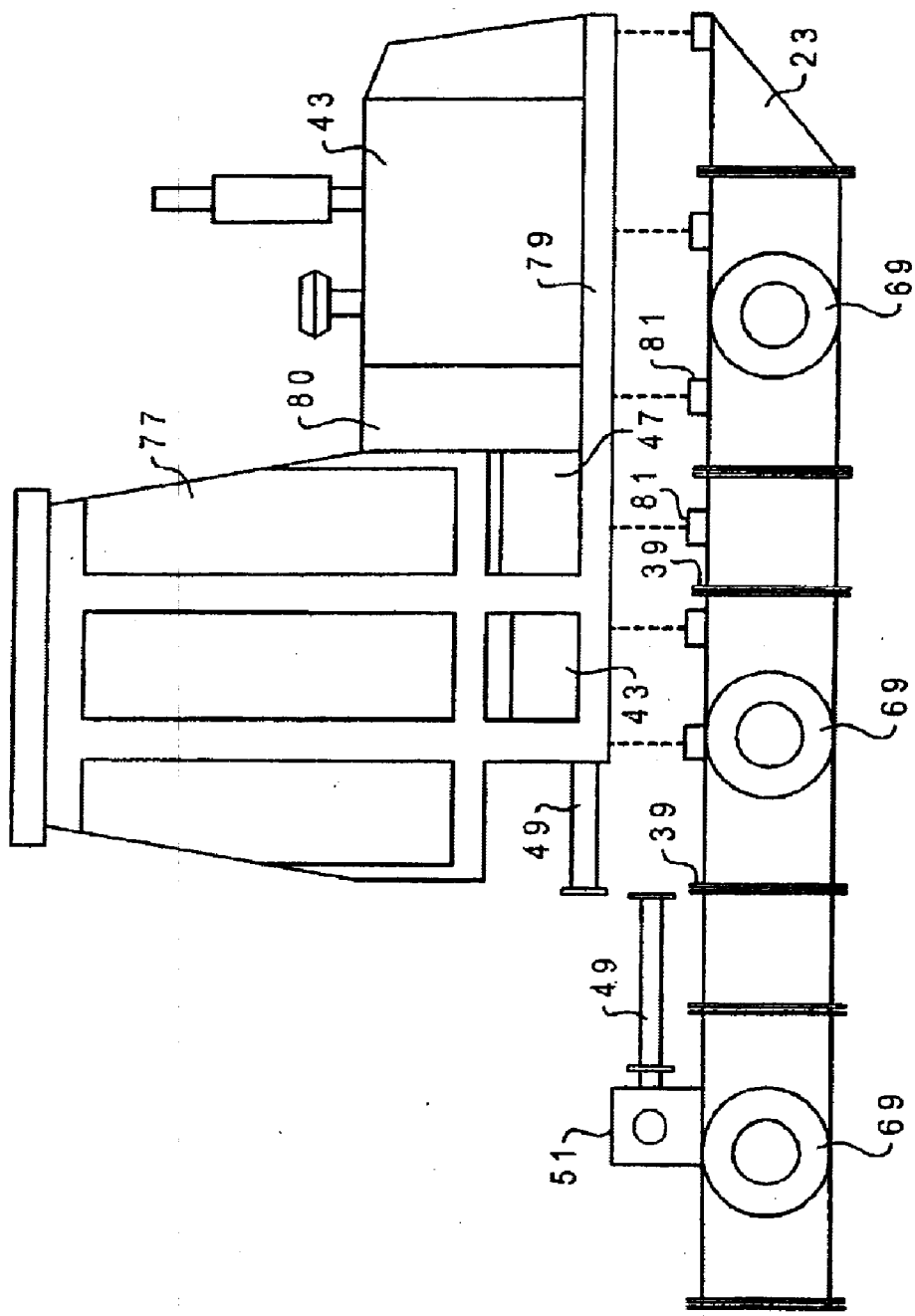
FIG. 12 is a side elevational view of the frame of FIG. 9 showing the engine and cab module exploded therefrom.

The frame provides a platform for mounting the engine 43, transmission 45, torque converter 47 and cab 77, as shown in FIG. 12. The engine, power components and cab are mounted on a skid 79, which skid is then lifted onto the frame 17. The engine 43, transmission 45, torque converter 47, cab 77 and skid 79 form a module 80 that can be preassembled and moved from one vehicle to another. Furthermore, the module 80 can be moved forward or rearward on a frame. For example, in FIG. 16, the module 80 is located directly over the wheels 13, while in FIG. 19, the module is located forward on the frame 17; an extension unit 23 is utilized on the front end of the frame. The drive shaft 49 is lengthened or shortened to accommodate the distance between the transmission 45, torque converter 47 and the differential steering device 51. The frame has standoffs 81 so that the skid will be above the flanges 39.

The shafts 52 can be viewed as input shafts. The shafts 52 can be driven by other mechanisms. As an alternative to using the transmission and torque converter, a hydraulic drive system could be used. In place of the transmission and torque converter, a hydraulic pump is used. The pump couples to the engine 43. Line connect the pump to hydraulic drive units, located at 51, one for each side, which then couple to shafts 52. Also, a diesel electric generator can be used and coupled via individual electric motors to shafts 52. Vehicles with diesel electric power trains are commonly used in mines.

Figure 14:
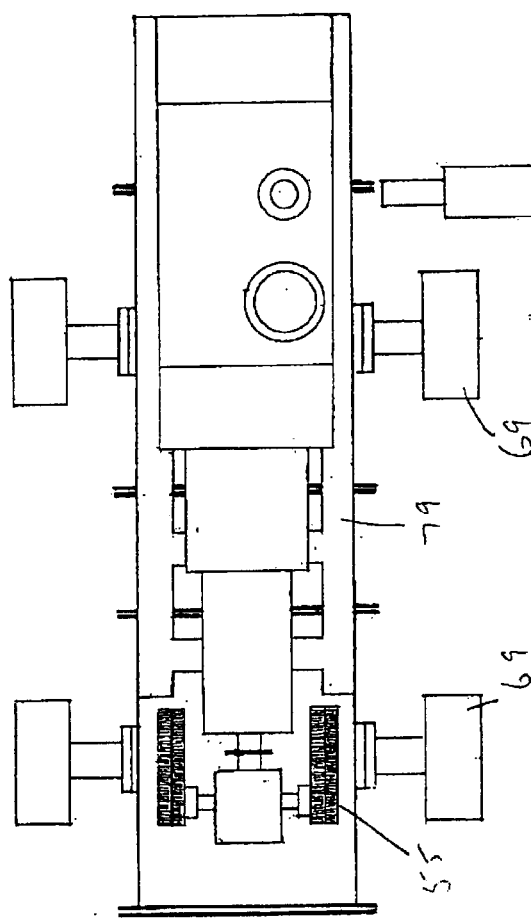
FIG. 14 is a top plan view of the frame and engine of FIG. 13.
Figure 15:
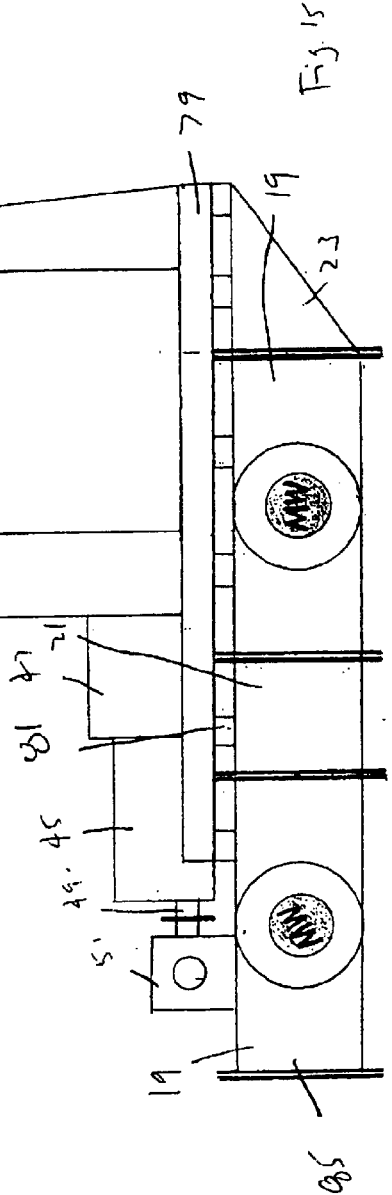
FIG. 15 is a side elevational view of the frame and engine of FIG. 13.
Figure 13:
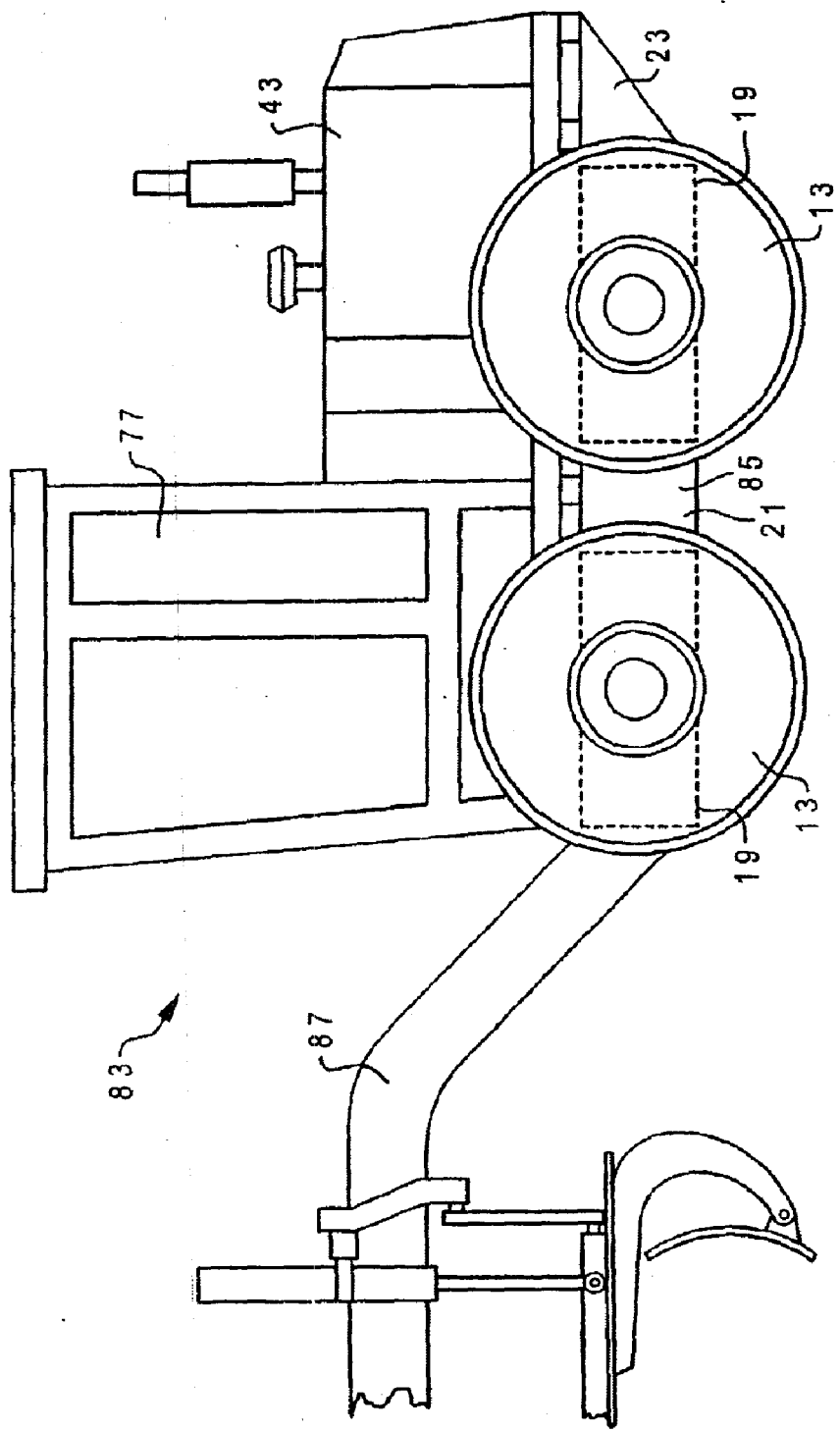
FIG. 13 is a side elevational view of a wheeled motor grader.
Figure 14:
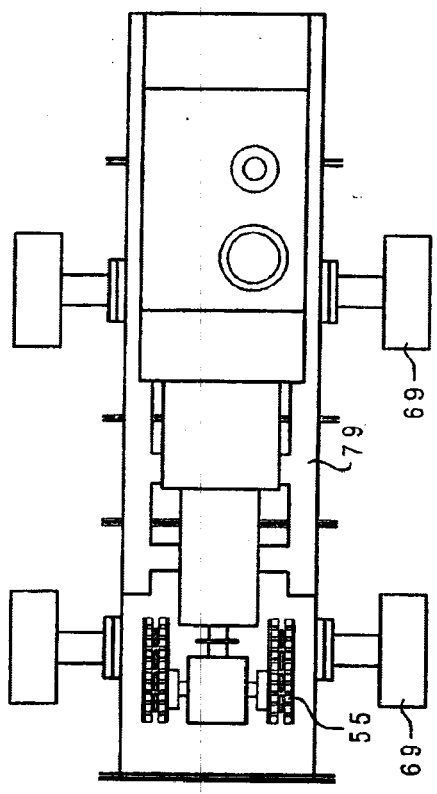
Figure 15:
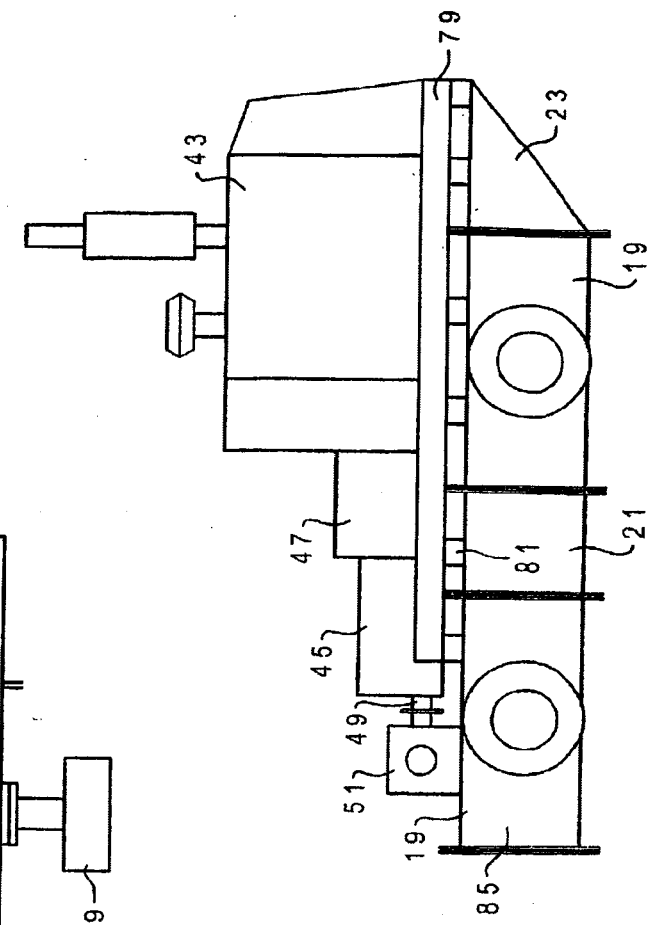

FIG. 13 shows a four wheel power train portion of a motor grader 83. The power train frame 85 is made up of an adapter module 21 interposed between two chain tank modules 19, and an extension unit 23. The grader unit 87 is mounted to the front end of the frame, either at the flanges 39 or to the wall 27, 29, 33 of the front chain tank module. FIGS. 14 and 15 show the power components, namely the engine 43, transmission 45, torque converter 47, all mounted onto a skid 79. The differential steering device 51 is mounted directly to the frame 85.

Figure 16:
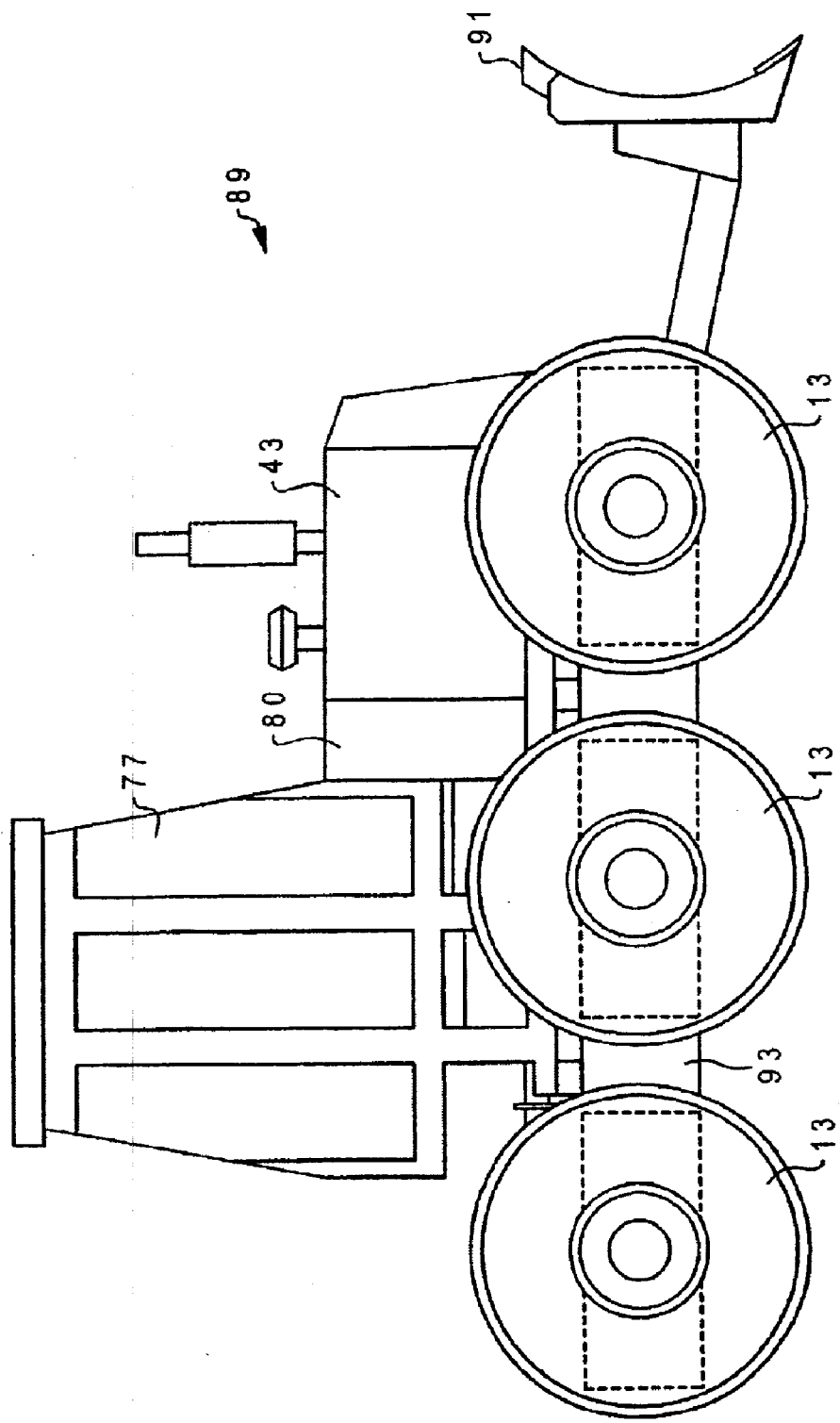
FIG. 16 is a side elevational view of a wheel dozer.

FIG. 16 shows a six wheel dozer 89 having a dozer blade 91 mounted to one end of the frame 93. The frame 93 is substantially similar to the frame 17 of FIG. 1, except that an extension unit 23 is not used. The dozer blade is mounted to the flange 39 or to the walls 27, 29, 33 of the endmost module. The blade 91 is mounted near the engine. Thus, the cab 77 orients the human operator to face over the engine to the blade. In the wheel loaders 11 of FIGS. 1 and 9, and the motor grader of FIG. 13, the operator faces away from the engine. The dozer 89 can utilize a hydraulic drive system.

Figure 17:
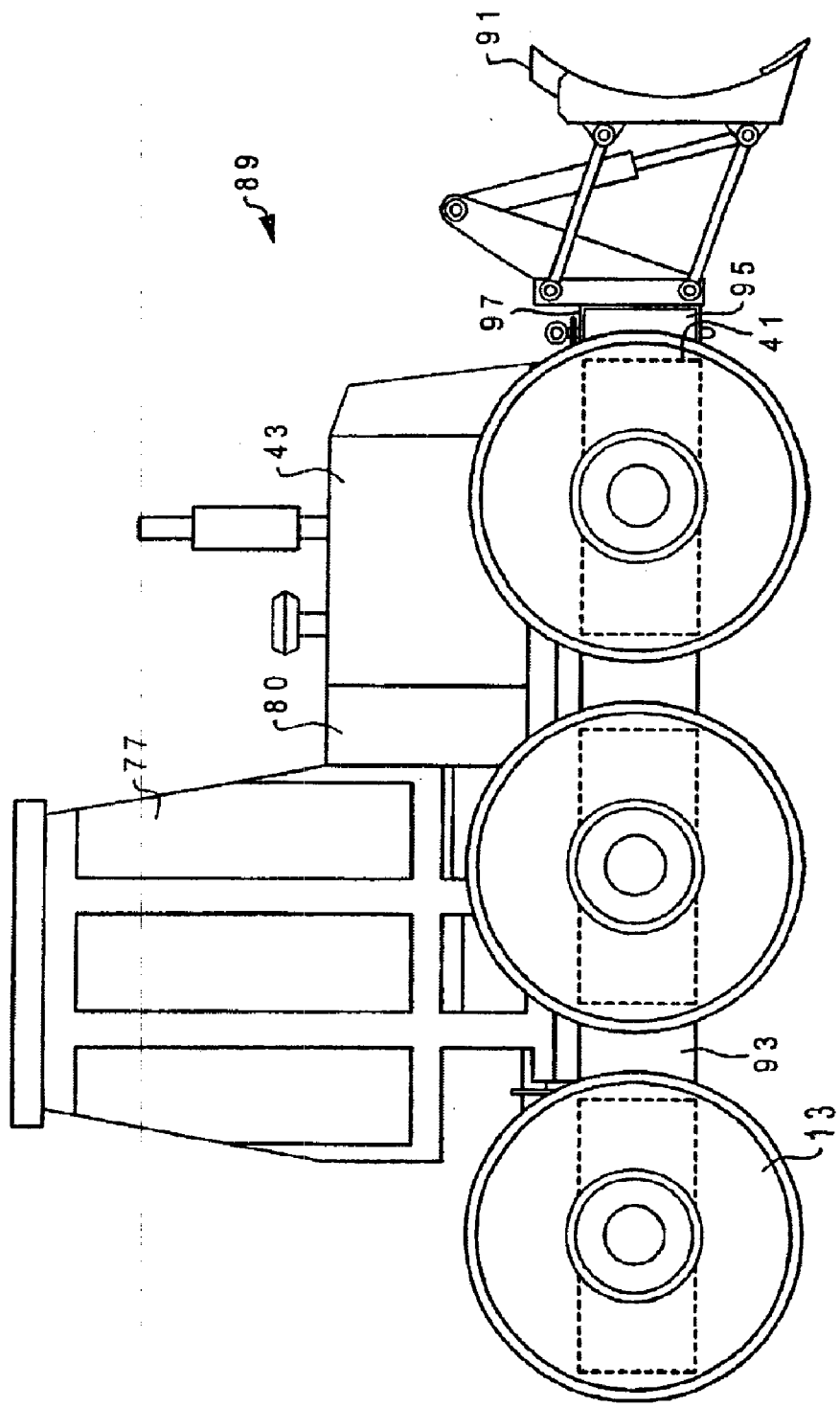
FIG. 17 is a side elevational view of a wheel dozer with a blade attachment.

FIG. 17 shows a six wheel dozer with a socket attachment 95 for the blade. The socket attachment 95 is mounted to the flanges 39 or to the walls 27, 29, 33 of the endmost chain tank module 19. The socket attachment 95 can be equipped with an end plate 41, or a separate end plate can be provided. The socket attachment receives a conventional and commercially available attachment 97.

Figure 18:
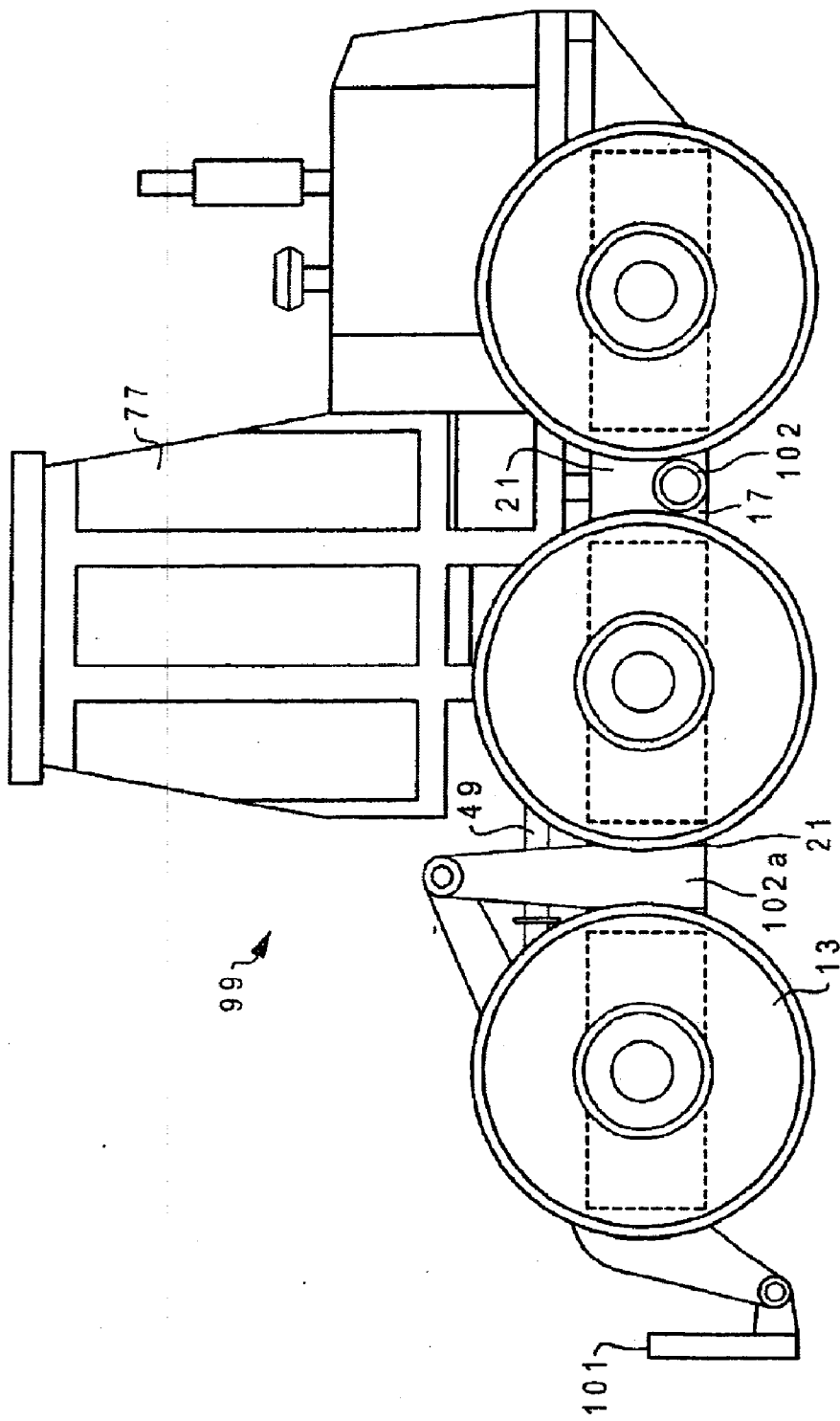
FIG. 18 is a side elevational view of a bidirectional vehicle.

FIG. 18 shows a bidirectional vehicle 99, which has a frame 17. The frame 17 has an implement attachment 101 positioned at one end. The cab 77 is designed so that the operator can face either end. A blade attachment 102 is shown on the frame 17. In the embodiment of FIG. 18, the blade attachment 102 is located on one of the adapter modules 21. If the attachment 102 must be modified or removed, the adapter module can be modified without the necessity of modifying a chain tank module and Its drive mechanisms. Likewise, another adapter module 21 has an attachment 102A for the implement attachment 101.

Thus, the adapter modules 21 can be used to provide spacing between the chain modules 19, as well as serve as platforms for attachments, tools and implements. By changing adapter modules, a vehicle can be reconfigured for other functions. The adapter modules 21 can be located in-between chain tank modules or at the ends of the frame, as shown in FIG. 17 (socket attachment 95).

Figure 19:
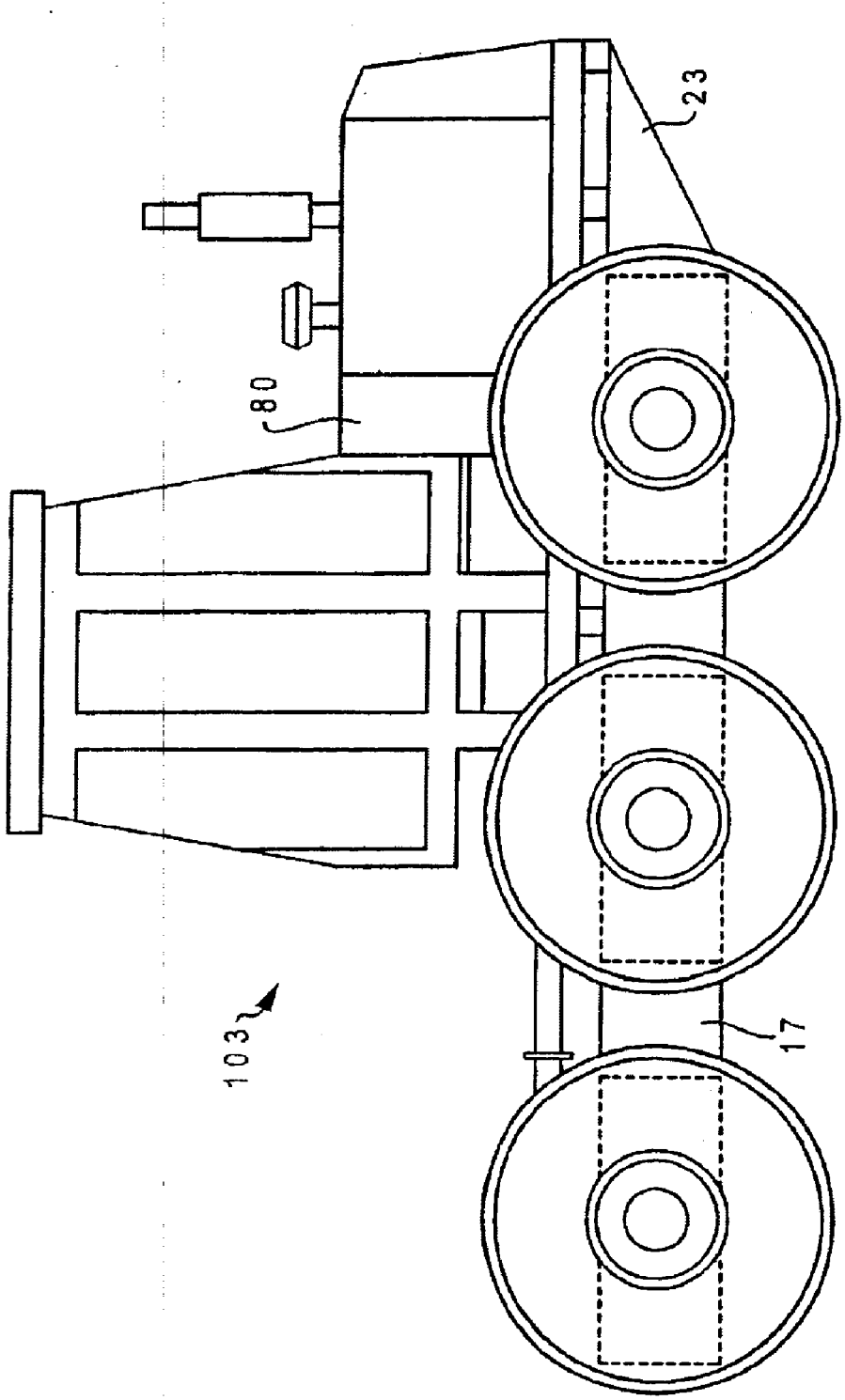
FIG. 19 is a side elevational view of an agricultural tractor.

FIG. 19 shows an agricultural, or pull, tractor 103 having a frame 17.

Figure 20:
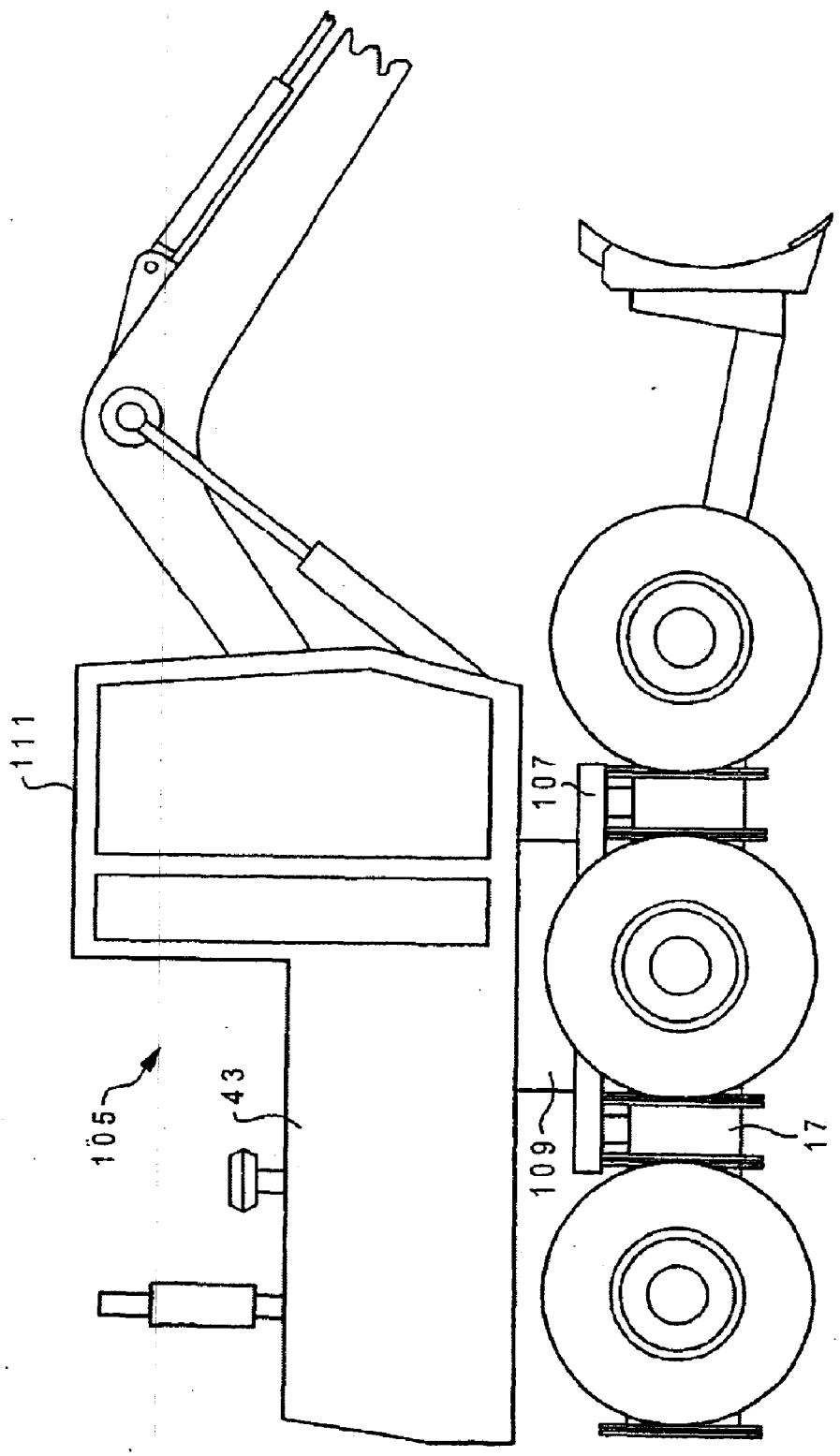
FIG. 20 is a side elevational view of a wheel excavator with a blade.

FIG. 20 shows a wheel excavator and blade vehicle 105, having a frame 17. The skid 107 is different in that the cab 111 and the engine, transmission and torque converter are on a rotational mechanism 109. Thus, the cab, engine, transmission and torque converter rotate with respect to the frame 17.

Figure 21:
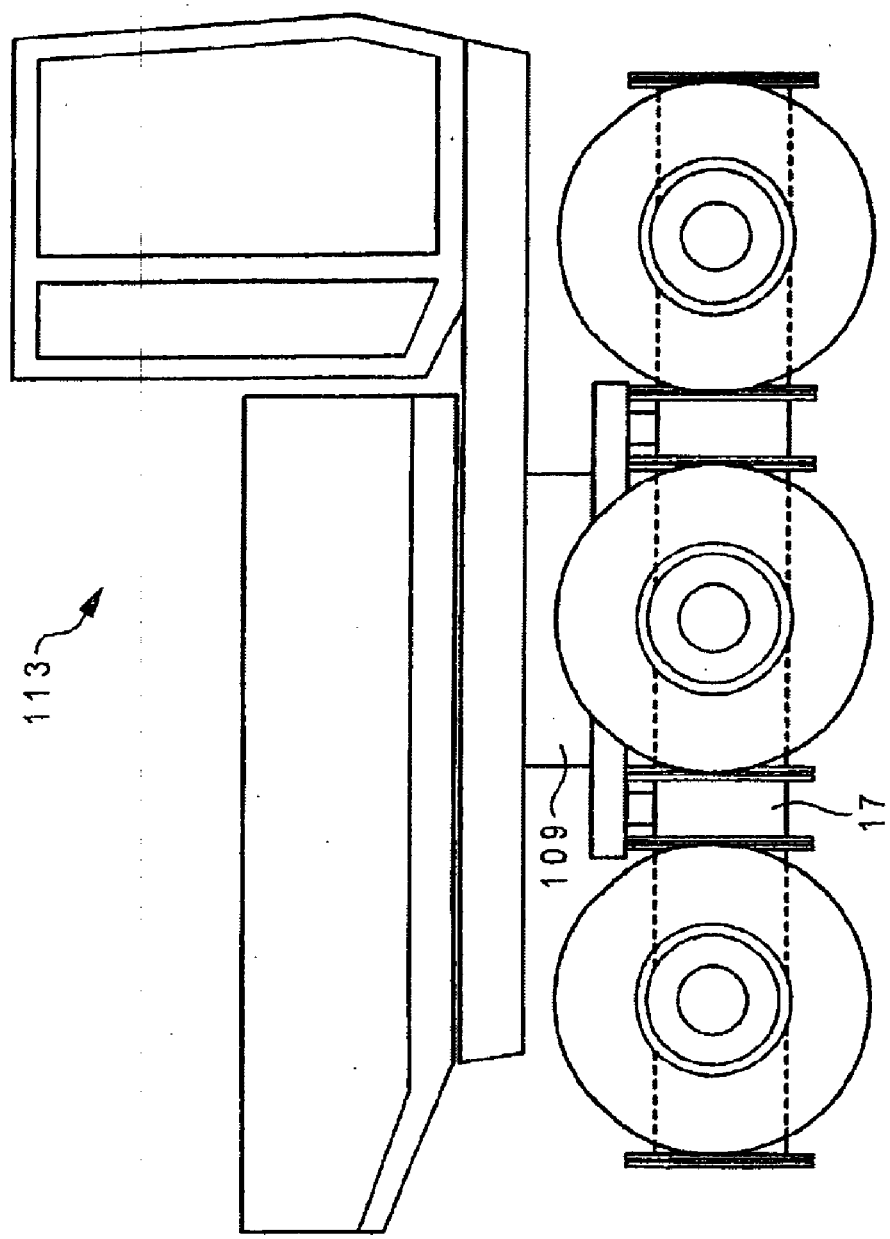
FIG. 21 is a side elevational view of a wheeled carrier with a dump truck body.

FIG. 21 shows a wheeled carrier 113, with a dump truck body, which also utilizes a rotational mechanism 109. The vehicles 105, 113 of FIGS. 20 and 21 utilize a hydraulic drive system.

Figure 22:
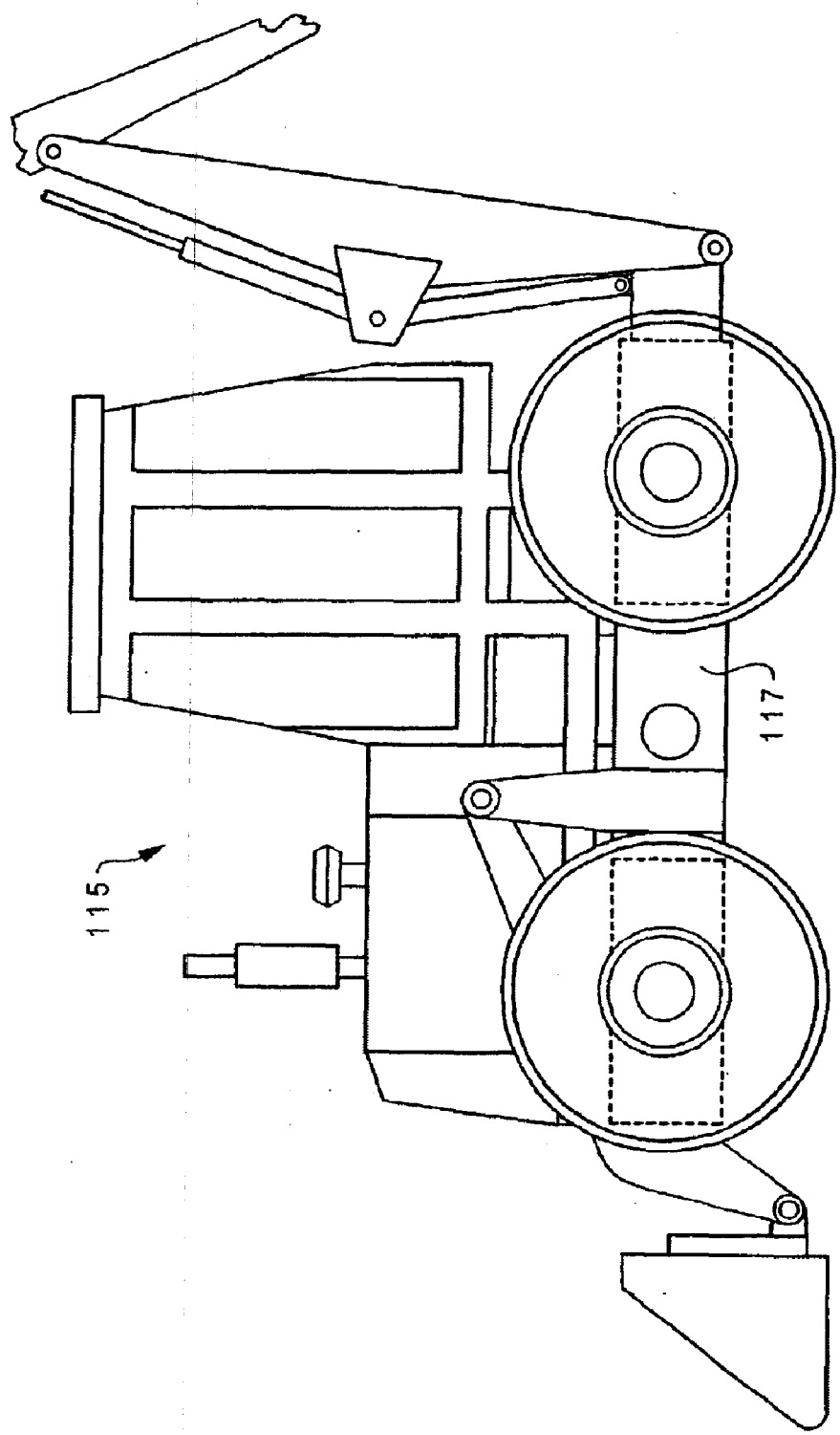
FIG. 22 is a side elevational view of a loader backhoe.
Figure 25:
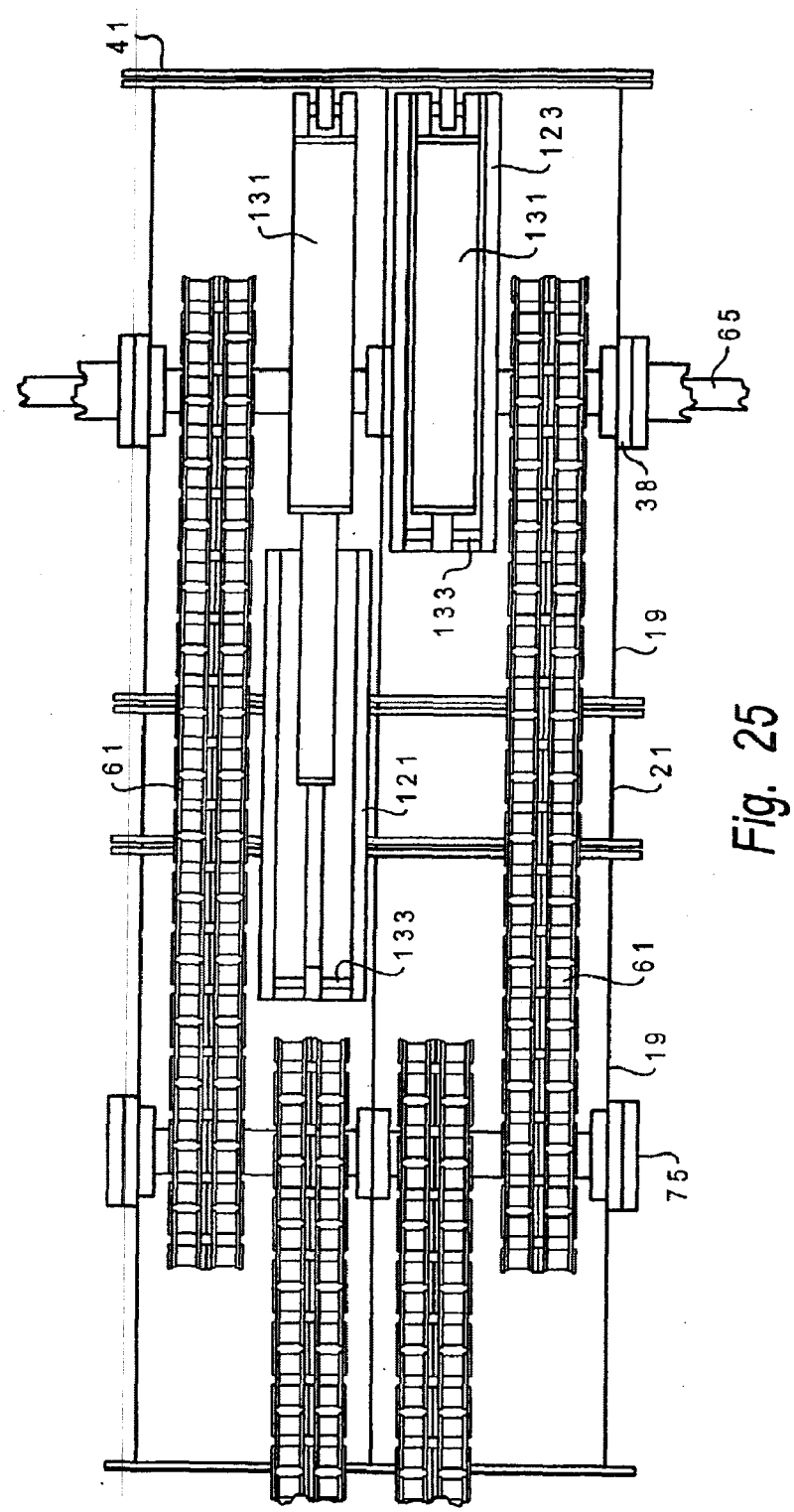

FIG. 22 shows a loader backhoe 115. The frame 117 has chain tank modules 19 and no adapter modules. The vehicle has four wheels; the middle chain tank module 19 serves as an adapter or spacer between the endmost chain tank modules. The cab allows the operator to face either end.

Figure 25:
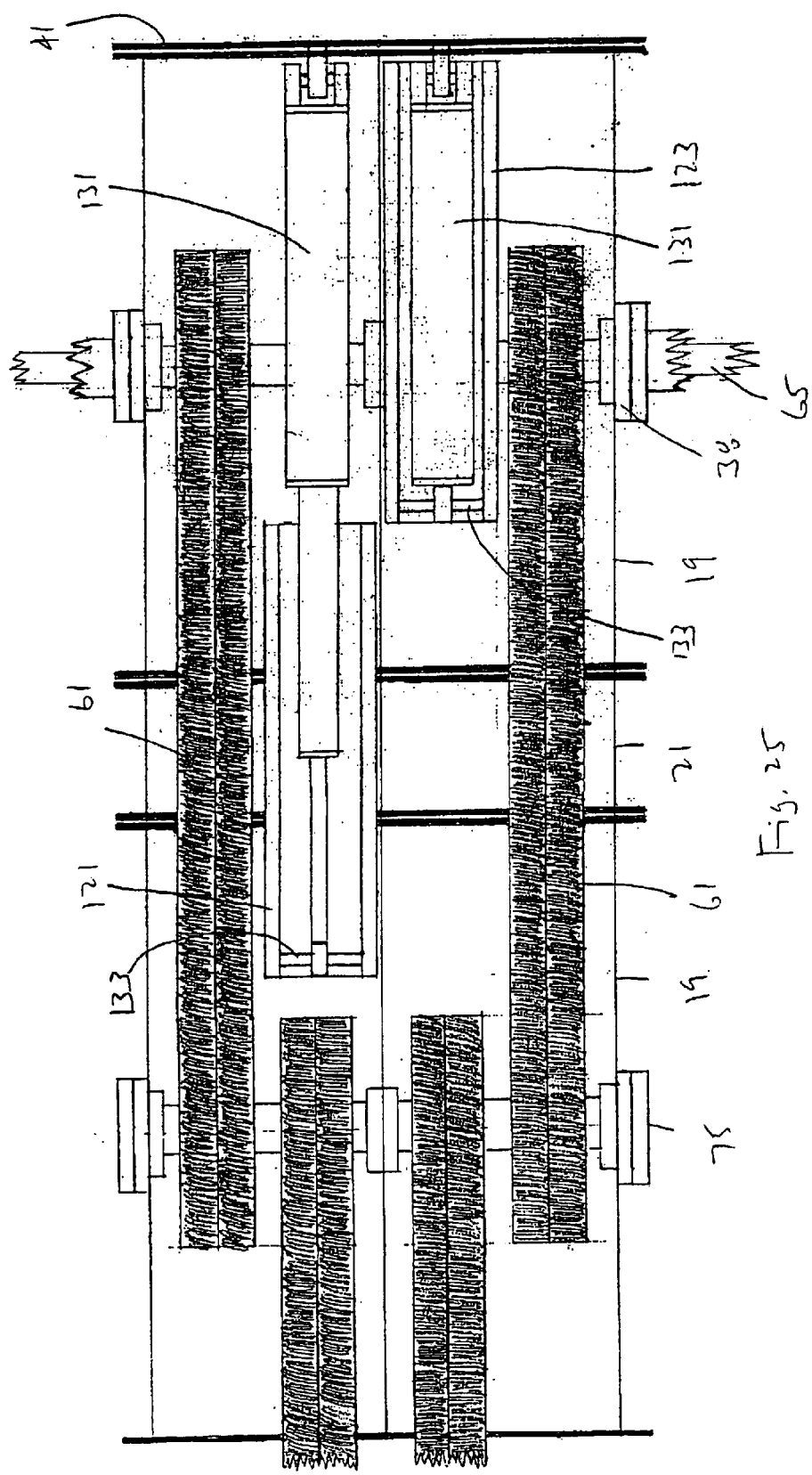
FIG. 25 is a top plan view showing the interior of several modules coupled together having counterweights therein.

The vehicle frame has located therein one or more moveable counterweights. Referring to FIGS. 23 and 24, first and second counterweights 121, 123 are shown. The counterweights are generally horseshoe shaped, having a horizontal slot 125 therein for receiving the shaft 59. Each counterweight has a side groove 127 along one side, the side that is against the module side wall 31, 33. The groove 127 intersects the slot 125. Each counterweight also has a groove 129 along a top thereof. The top groove 129 receives an actuator 131, as shown in FIG. 25. The actuator 131 is coupled to the respective counterweight by a pin 133 and to an end plate 41. The actuators 131 can be dual acting hydraulic cylinders, coarse threaded screws, rack and pinion arrangements, etc.

As shown in FIG. 6, two of the chain tanks 25 have two wheel cogs 57 (for accepting the drive chains), while the chain tank that is furthest away from the primary drive chain 55 has only a single wheel cog 57. Note that because each module 19 has two chain tanks 25, the two modules 19 Including and nearest the primary drive chain 55 each have four wheel cogs, while the module 19 furthest away from the primary drive chain has two wheel cogs.

Referring to FIG. 25, the endmost module 19, having only two wheel cogs (one wheel cog per chain tank), has a space in each chain tank between the wheel cog and the respective side wall. The counterweights 121, 123 are located in these spaces. There is a counterweight in each chain tank 25. For each chain tank, the respective counterweight is located between the wheel cog and the respective side wall. As seen in FIG. 25, the counterweights are located between the wheel cogs and the inner side wall 31. The side groove 127 of the counterweights receives the bearing 60. In the configuration shown, the counterweight is sized as large as possible for the space. However, the counterweight could be sized smaller, so as to be spaced further from the inner side wall and eliminate the need for the side groove. In addition, the location of the counterweight inside the tanks can be varied. For example, the counterweights can be located between the wheel cog and the outer side wall. In addition, the chain tank modules can be made wider than as shown in the drawings, in order to accommodate two wheel cogs and a counterweight across the width of a single chain tank. Alternatively, the chain tank modules can be provided with three tanks, with the outermost tanks receiving the wheel cogs and the innermost tank receiving the counterweight. This latter arrangement would allow the counterweight to travel beyond the next adjacent wheel cog.

Figure 26:
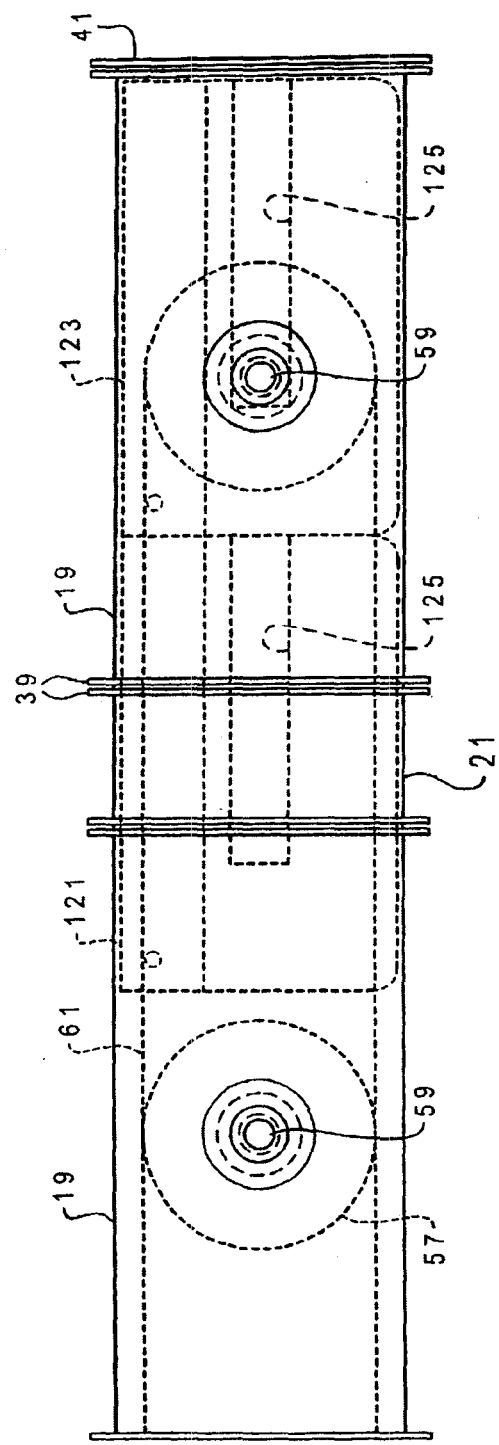
FIG. 26 is a side elevational view of the arrangement of FIG. 25.

As described above, each counterweight has an actuator 131. One end of the actuator is coupled to the counterweight, with the other end being coupled to the adjacent end plate 41. The actuators 131 are controlled from the cab. The actuators move the counterweights inside of the frame. FIGS. 25 and 26 show one counterweight 121 away from the end plate and the other near the end plate to illustrate the possible differing locations of the counterweights. In practice however, the counterweights would be moved together. The movement of the counterweights is eased by the lubricant contained within the tank. The actuators also fix and secure the counterweights once in position.

When the counterweights are located near the end plate, much of their weight is over or even beyond the endmost shafts 59, which support the wheels 13. When the counterweights are located away from the end plate and closer to the center of the vehicle, they are between the shafts 59 of the two chain tank modules.

The counterweights are useful for a vehicle such as the wheel loader 11 of FIG. 1. Referring to the orientation of FIG. 1, the counterweights 121, 123 are located in the rightmost chain tank module 19, under the engine 43. With the configuration shown in FIG. 1, the engine 43 and the counterweights serve to counterweight the bucket 15 and its load. However, if the bucket 15 is removed from the vehicle and replaced with another tool, the counterweights are moved toward the center of the vehicle to rebalance the vehicle. The vehicle 89 in FIG. 16 shows another example of the use of the counterweights. The engine 43 and counterweights 121, 123 serve to weight down the vehicle front end for better operation of the dozer blade 91, if the front end is too heavy, the counterweights are moved toward the vehicle center; if more front end mass is needed, the counterweights are moved away from the vehicle center.

A vehicle can utilize a selected combination of steerable and nonsteerable axle assemblies 65, 67. FIGS. 27A–27F illustrate the types of steering available when all wheels have steerable axle assemblies "S". FIGS. 27A–27K are schematic representations of the wheel positions of vehicles; the frames are not shown.

Figure 27A:
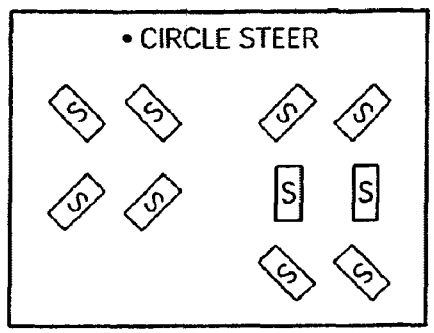
FIGS. 27A–27K are schematic illustrations of various steering arrangements that can be utilized by vehicles of the present invention.
Figure 27B:
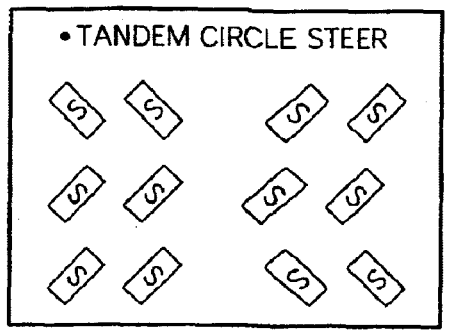
Figure 27C:
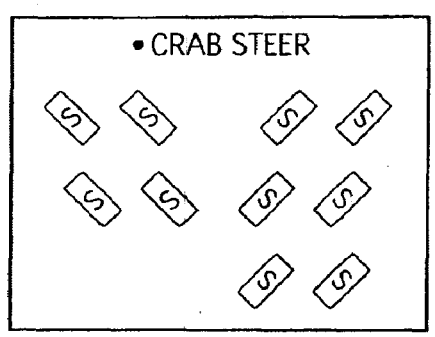
Figure 27D:
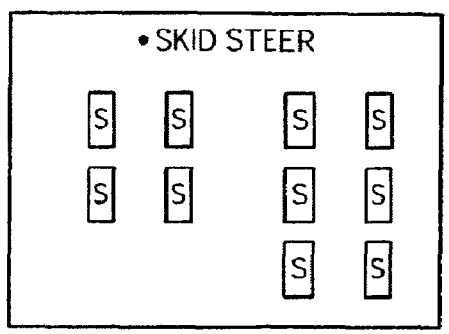

With the present invention, a multiwheel vehicle can be made in a variety of configurations and utilize a variety of steering modes. FIGS. 27A–27F illustrate vehicles equipped with all steerable wheel axle assemblies. (In the FIGS., rectangles with "S" mean a steerable wheel, while rectangles with "N" mean a nonsteerable wheel.) In FIG. 27A, the vehicle, whether it be a four wheel or six wheel vehicle, can utilize circle steering, wherein the front wheels are turned in one direction and the rear wheels are turned in the opposite direction. As used In this description of steering,turning means aiming the wheel in a new direction relative to the frame.

In the six wheel vehicle, the intermediate wheels need not be turned. The intermediate wheels are turned when using tandem circle steer, FIG. 27B. The intermediate wheels are turned in conjunction with either the rear wheels or the front wheels. Alternatively, with crab steering, FIG. 27C, used with four or six wheel vehicles, all wheels are turned in the same direction and the vehicle moves with a sideways component. In the steering arrangements of FIGS. 27A–27C, the wheels are all rotated in the same direction. With skid steering,FIGS. 27D, the wheels on one side of the vehicle are rotated in the opposite direction relative to the wheels on the other side of the vehicle; this is known as counter-rotation. In skid steering,the wheels need not be turned.

Figure 27E:
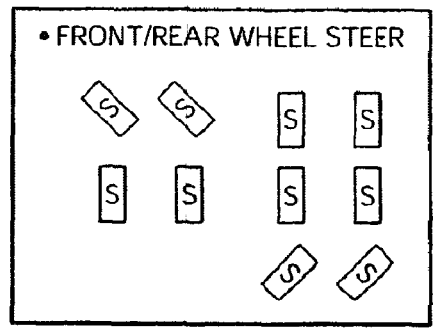

FIG. 27E shows front or rear wheel steering where the wheels on one end of the vehicle are turned. Six wheel vehicles can also utilize tandem steering, wherein the intermediate wheels are turned in the same direction as the front or rear wheels The wheels are rotated in the same direction.

Figure 27F:
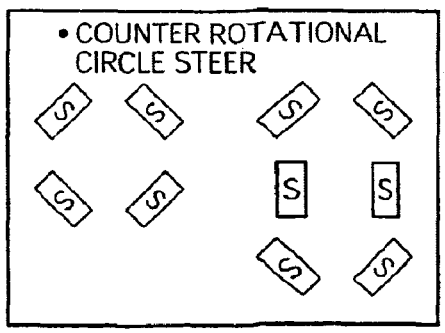

FIG. 27F shows counter-rotational circle steer. For this type of steering, the individual front wheels turn inward, while the rear wheels turn outward. For example, with a four wheel vehicle, the left front and right rear wheels turn to the right, while the right front and left rear wheels turn to the left. The wheels are counter-rotated in the direction that the vehicle is to be turned to.

Figure 27G:
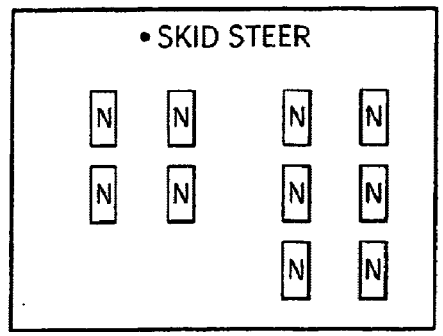

FIG. 27G illustrates the type of steering available when only nonsteerable wheel axles are used. Only skid steering can be attained.

Figure 27H:
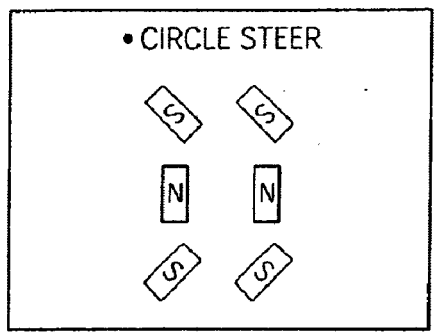
Figure 27I:
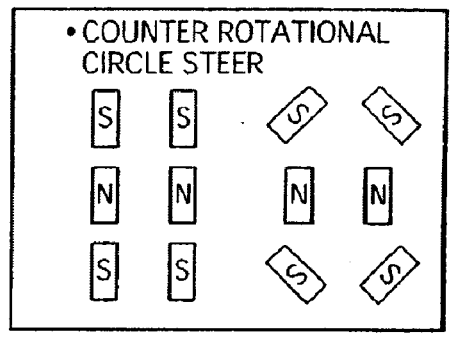
Figure 27J:
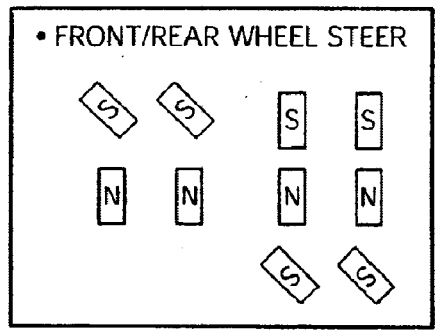
Figure 27K:
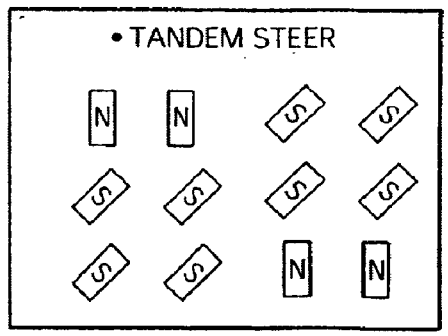

FIGS. 27H–27K illustrate vehicles equipped with both steerable and nonsteerable wheel axle assembles. In FIGS. 27H–27J, the intermediate wheels are nonsteerable while the other wheels are steerable. FIGS. 27H shows circle steering, wherein the wheels are all rotated in the same direction. FIG. 27I shows counter-rotational circle steer where the wheels are counter-rotated. FIG. 27J shows front or rear wheel steering. FIG. 27K is a variation of front or rear wheel steering,known as tandem steering. The intermediate wheels are steerable; either the front or rear wheels are nonsteerable. In FIGS. 27J and 27K, the wheels are rotated in the same direction.

With the frame of the present invention, only a small number of component types need be manufactured to make up a frame or chassis of a vehicle. This simplifies inventory control for manufacturing,repair and maintenance of vehicles. In addition, having a small number of interchangeable parts for a basic component such as a frame adds resale value as well as salvage value to a vehicle after its useful life is reached. In such an instance, the owner of the vehicle can salvage parts of the frame to utilize on vehicles of other types and models.

The modules can be used to make a jointed vehicular frame. That is to say that two or more frames can be coupled together. For example, two frame sections, each having two chain tank modules 19, can be rotationally coupled together end-to-end. This creates an eight wheel vehicle. The rotational coupling allows the frame sections to roll with respect to one another. Using sections of frames allows the chains to exert less load, because the load can be divided between sections.

The foregoing disclosure and showings made in the drawings are merely illustrative of the principles of this invention and are not to be interpreted in a limiting sense.

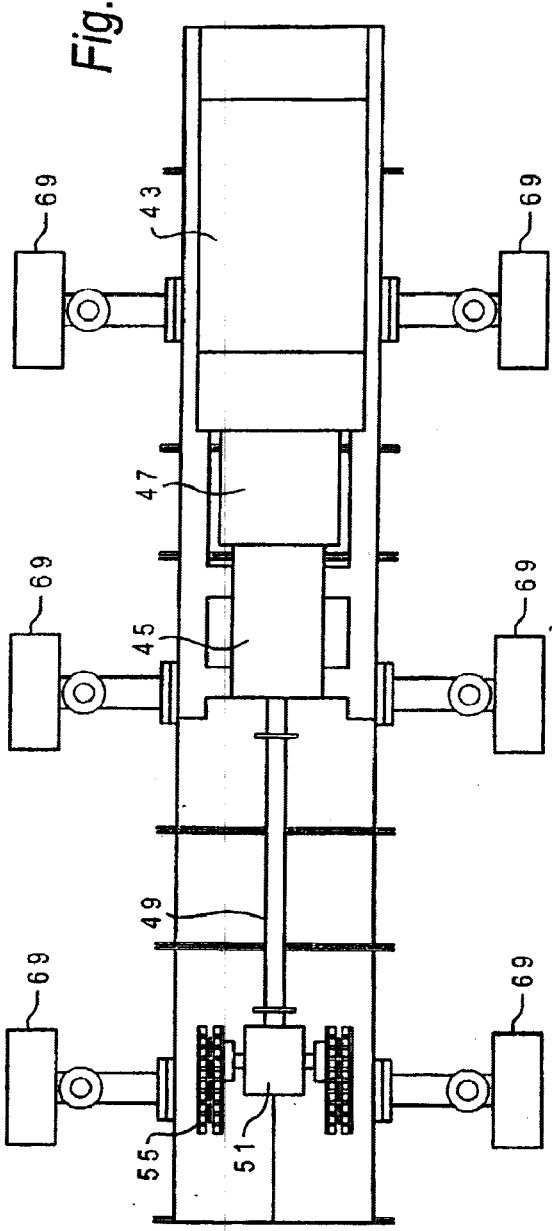
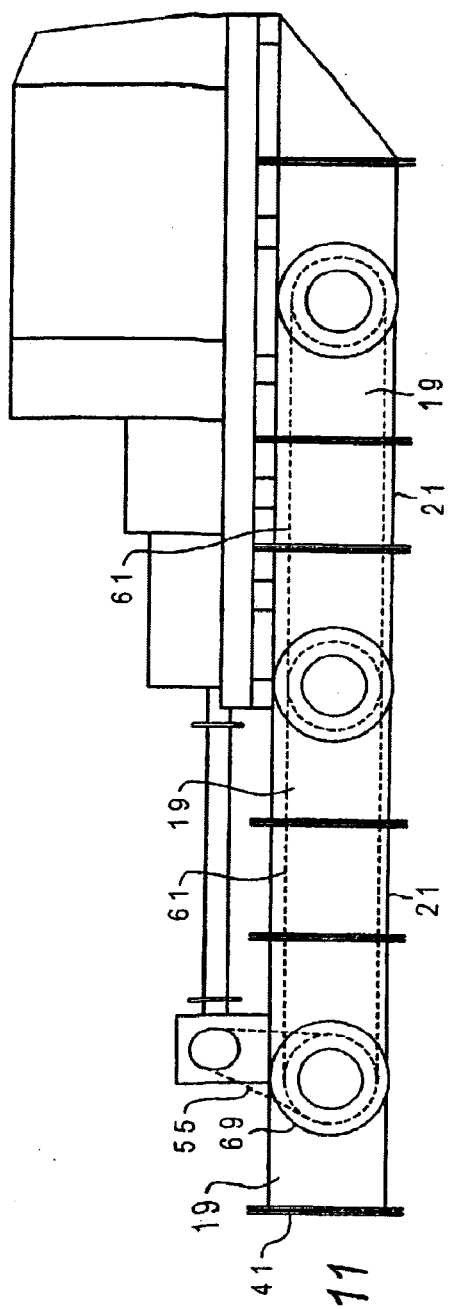

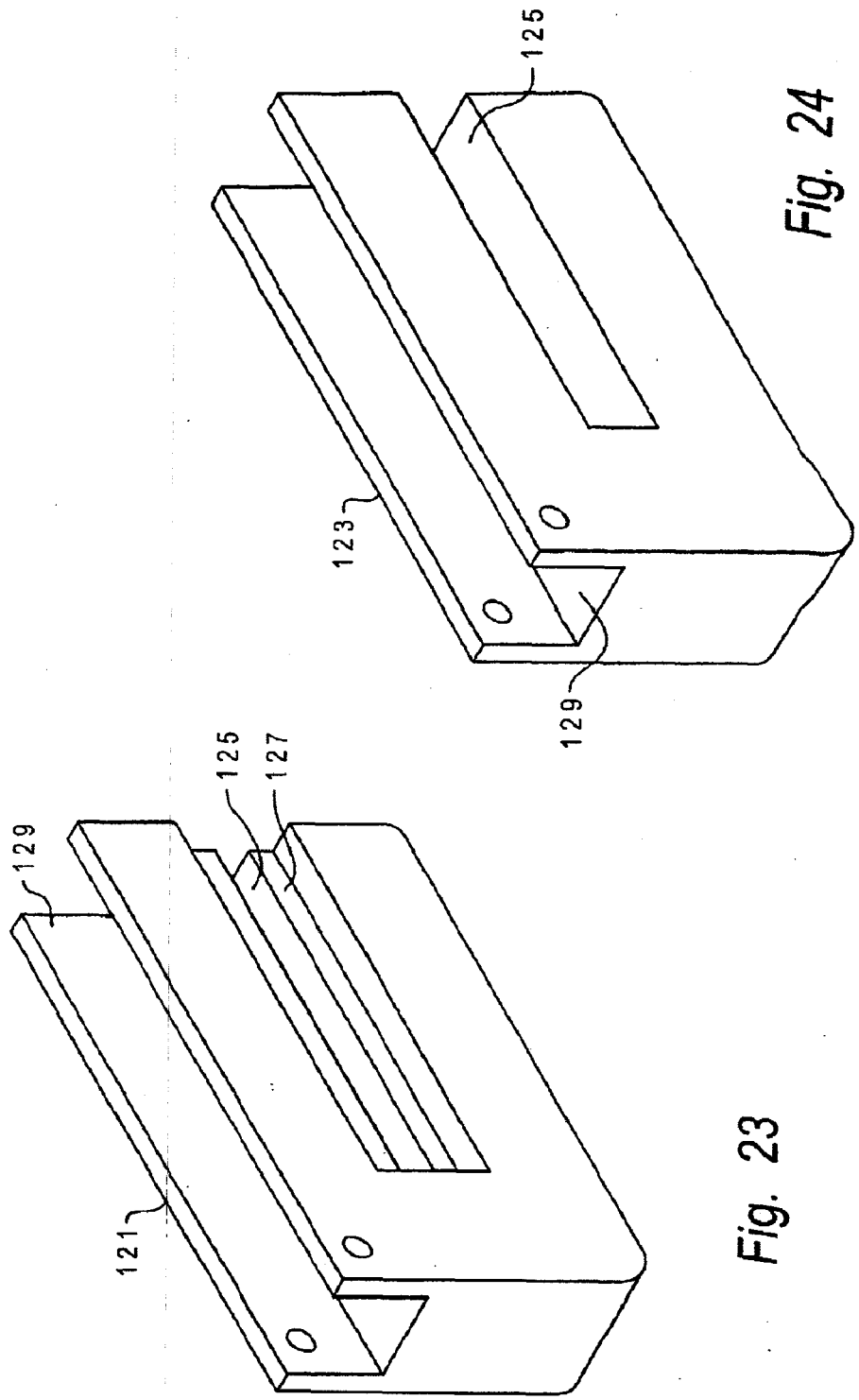

What is claimed is:

1. A frame module for use in constructing a frame for an off-highway vehicle, comprising:
    a) a tank having two ends and top, bottom and side walls, with the tank ends open;
    b) the ends having first couplings that are structured and arranged to couple the module to another module;
    c) at least one wheel cog located in the tank and mounted on a shaft so as to rotate within the tank, the shaft extending between the side walls, the wheel cog structured and arranged to accept a drive chain;
    d) the shaft having a second coupling at one of the side walls that is structured and arranged to couple to a wheel axle assembly.

2. The frame module of claim 1 further comprising an opening in the top wall, the opening being structured and arranged for receiving the drive chain around the wheel cog.

3. The frame module of claim 1 wherein the shaft second coupling further comprises a receptacle for receiving an axle of the wheel axle assembly.

4. The frame module of claim 1 further comprising a fitting structure and arranged for receiving a steering actuator on the wheel axle assembly.

5. The frame module of claim 1 further comprising an inside support wall.

6. The frame module of claim 1, further comprising:
    a) an opening in the top wall, the opening being structured and arranged for receiving the drive chain around the wheel cog;
    b) the shaft has a respective second couplings at each end of the side walls, the second couplings being structured and arranged to couple to the wheel axle assembly.

7. An off-highway vehicle, comprising:
    a) a rigid frame;
    b) a power source mounted to the frame;
    c) the frame comprising at least two modules, with each module having top, bottom and side walls and two ends, each module having first couplings at each end, the modules being connected together in an end-to-end manner by the first couplings, the frame having endmost modules, which endmost modules have free ends which free ends are covered, wherein the modules form a tank that can contain a lubricant;

d) each of the endmost modules having at least one wheel cog rotatably located therein, the wheel cog having second couplings located at the side walls;

e) a primary drive chain extending from the power source through an opening in the top wall of one of the modules and around the respective wheel cog;

f) a secondary drive chain extending through the tank from a second wheel cog in the module of the primary drive chain to the next adjacent module having the wheel cog;

g) wheel axle assemblies mounted to the second couplings.

8. The vehicle of claim 7 wherein the modules are first modules, with each of the first modules comprising the wheel cog and second couplings, the frame further comprising at least one second module interposed between two of the first modules, the second module having first couplings and lengthening the tank between the second couplings.

9. The vehicle of claim 7 wherein the frame comprises three of the modules, there being two endmost modules and an intermediate module, with the endmost modules having wheel axle assemblies mounted thereto and with the intermediate module lacking wheel axle assemblies, the intermediate module having wheel cogs coupled to the wheel cogs in the endmost modules by drive chains.

10. The vehicle of claim 7 wherein the frame comprises three of the modules, there being two endmost modules and an intermediate module, the endmost and intermediate modules having wheel axle assemblies mounted thereto, the intermediate module having wheel cogs coupled to the wheel cogs in the endmost modules by drive chains.

11. The vehicle of claim 10 wherein the modules are first modules, the frame further comprising at least one second module interposed between two of the first modules, the second module having first couplings and lengthening the tank.

12. The vehicle of claim 7 further comprising:

a) a counterweight located in one of the endmost modules, the modules being sealed together, the one endmost module containing a lubricating oil bath;

b) an actuator coupled to the counterweight, wherein the actuator moves the counterweight inside of the frame.

13. The vehicle of claim 7 wherein the modules are first modules, with each of the first modules comprising a wheel cog and second couplings, the frame further comprising at least one second module coupled to one of the first modules, the second module having first couplings and an attachment for a tool.

14. A method of constructing a rigid frame for an off-highway vehicle, comprising the steps of:

a) providing a set of modules, each of the modules having two ends and a wheel cog rotatably mounted therein;

b) coupling at least two of the modules together in an end-to-end manner;

c) coupling the wheel cogs and the coupled modules together with one or more drive chains;

d) rotatably coupling wheel axles with at least some of the wheel cogs in the coupled modules.

15. The method of claim 14 wherein:

a) the step of providing a set of modules further comprises the step of providing a first set of modules having the same length between respective ends;

b) providing a second set of modules;

c) coupling at least two modules from the first set and a module of the second set together in an end-to-end manner, with the module from the second set being between the modules from the first set.

16. The method of claim 14 wherein the step of coupling at least two of the modules together in an end-to-end manner further comprises the step of coupling a number of the modules together so that the frame has a predetermined length.

17. The method of claim 14 wherein the step of coupling at least two of the modules together in an end-to-end manner further comprises the step of coupling a number of the modules together so that the frame has a predetermined wheel base.

18. The method of claim 14 wherein the step of coupling at least two of the modules together in an end-to-end manner further comprises the step of coupling a number of the modules together so that the frame can accommodate a predetermined wheel diameter.

19. The method of claim 14, further comprising the steps of:

a) providing a cab and an engine on a platform;

b) mounting the platform to the frame.

* * * * *

UNITED STATES PATENT AND TRADEMARK OFFICE
CERTIFICATE OF CORRECTION

PATENT NO. : 6,779,617 B1
DATED : August 24, 2004
INVENTOR(S) : James S. Kole, Jr.

It is certified that error appears in the above-identified patent and that said Letters Patent is hereby corrected as shown below:

The title page showing an illustrative figure, should be deleted and substitute therefor the attached title page.

Delete Figures 1-27K and substitute therefor Figures 1-27K on the attached pages.

Signed and Sealed this

Twenty-third Day of August, 2005

JON W. DUDAS
*Director of the United States Patent and Trademark Office*

(12) United States Patent
Kole, Jr.

(10) Patent No.: US 6,779,617 B1
(45) Date of Patent: Aug. 24, 2004

(54) MULTIWHEELED MODULAR RIGID FRAME VEHICLE

(76) Inventor: James S. Kole, Jr., 2901 Elmside, No. 105, Houston, TX (US) 77042

(*) Notice: Subject to any disclaimer, the term of this patent is extended or adjusted under 35 U.S.C. 154(b) by 0 days.

(21) Appl. No.: 10/145,770

(22) Filed: May 15, 2002

(51) Int. Cl.$^7$ .............................................. B62D 61/12
(52) U.S. Cl. ..................................................... 180/24.08
(58) Field of Search ............................. 180/24.08, 65.2

(56) References Cited

U.S. PATENT DOCUMENTS

| | | |
|---|---|---|
| 3,052,311 A | 9/1962 | Leedom |
| 3,101,150 A | 8/1963 | Janson et al. |
| 3,168,927 A | 2/1965 | Garner |
| 3,198,551 A | 8/1965 | Garner |
| 3,504,753 A * | 4/1970 | Rutley ....................... 180/14.7 |
| 4,210,218 A | 7/1980 | Oswald et al. |
| 4,266,625 A | 5/1981 | Garner et al. |
| 4,299,530 A * | 11/1981 | Schaeff ........................ 414/719 |
| 4,469,369 A | 9/1984 | Belik et al. |
| 4,782,906 A | 11/1988 | Kole |
| 5,685,563 A | 11/1997 | Ottestad |
| 5,823,569 A | 10/1998 | Scott |
| 6,003,935 A * | 12/1999 | Kalazny ....................... 296/204 |
| 6,138,783 A | 10/2000 | Chene et al. |

FOREIGN PATENT DOCUMENTS

| | | |
|---|---|---|
| FR | 796829 | 1/1956 |
| FR | 2 593 767 | 8/1987 |
| WO | WO 94/14628 | 7/1994 |

OTHER PUBLICATIONS

John Deere Model No. TC44H TC54H TC62H Quickl–Coupler, John Deere Construction Equipment Division, cover page, p. 4–5.

New Holland LB115 4–Wheel Steer Loader Backhoe, 1 page.
John Deere Crawler Dozer Model 650H, 1 page.
John Deere 495D Excavator Specification Sheet, C–9–88, 1 page.
Kobelco Bladerunner ED 180, 1 page.
John Deere Model 8000T Series Tractors Specification Sheet, printed in USA (96–07), 1 page.
Model 570B Specification Sheet, 1 page.
Melroe M–880 Power Module Specification Sheet, 2 pages.
New Holladn TV140 Bidirectional Tractor brochure, 5 pages.
Clark–Hurth 12S Series and Model 279 Planetary Steer Axle information sheet, 1 page.

* cited by examiner

*Primary Examiner*—Charles T. Jordan
*Assistant Examiner*—Bret Hayes
(74) *Attorney, Agent, or Firm*—Geoffrey A. Mantooth

(57) ABSTRACT

A vehicle can be designed using modular frame components. There is provided a chain tank module having one or more chain tanks and an adapter module which provides spacing between individual chain tank modules. Wheels are mounted to the chain tank modules. The chain tank modules have wheel cogs to receive drive chains and also receptacles for receiving axles for the wheel hubs. The frame allows the use of steerable or nonsteerable axle assemblies to accommodate a wide variety of steering mechanisms for vehicles. By utilizing the chain tank and adapter modules, frames of different lengths, widths and wheel configurations can be designed and constructed using a small number of standard interchangeable parts. The cab and engine components are mounted onto a skid which in turn is mounted onto the frame. Drive chains are utilized to rotate the wheels. The drive chains extend through the chain tanks which contain a lubricant therein.

19 Claims, 24 Drawing Sheets

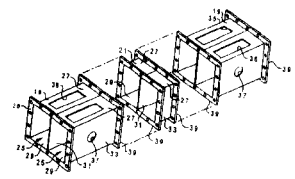

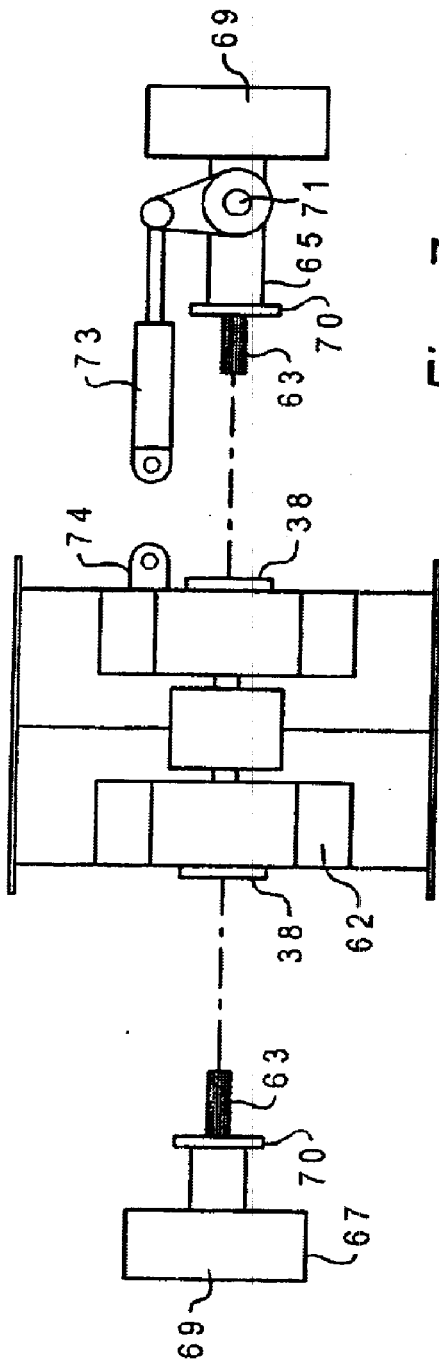
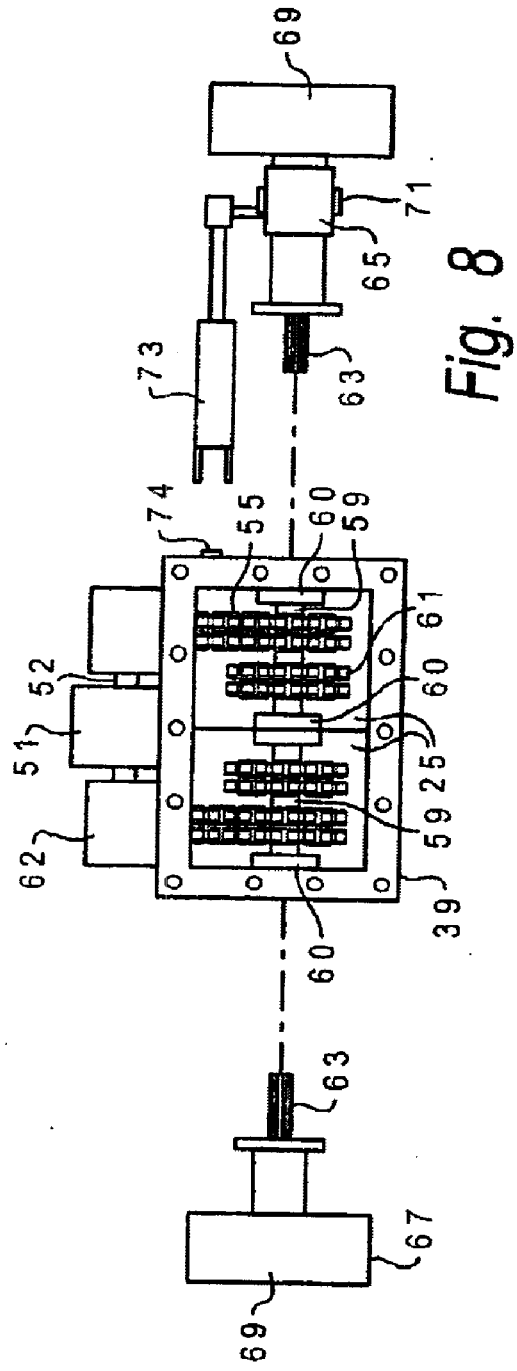
Fig. 7
Fig. 8